United States Patent
Daloukas et al.

(10) Patent No.: US 10,671,787 B2
(45) Date of Patent: *Jun. 2, 2020

(54) LARGE-SCALE POWER GRID ANALYSIS ON PARALLEL ARCHITECTURES

(71) Applicant: HELIC, INC., Santa Clara, CA (US)

(72) Inventors: Konstantis Daloukas, Athens (GR); Nestoras Evmorfopoulos, Athens (GR); Panagiota Tsompanopoulou, Athens (GR); Georgios Stamoulis, Athens (GR)

(*) Notice: Subject to any disclaimer, the term of this patent is extended or adjusted under 35 U.S.C. 154(b) by 185 days.

This patent is subject to a terminal disclaimer.

(21) Appl. No.: 15/845,145

(22) Filed: Dec. 18, 2017

(65) Prior Publication Data

US 2018/0121588 A1  May 3, 2018

Related U.S. Application Data

(63) Continuation of application No. 14/056,667, filed on Oct. 17, 2013, now Pat. No. 9,858,369.

(60) Provisional application No. 61/715,499, filed on Oct. 18, 2012.

(51) Int. Cl.
*G06F 30/367* (2020.01)
*G06F 119/06* (2020.01)

(52) U.S. Cl.
CPC ........ *G06F 30/367* (2020.01); *G06F 2119/06* (2020.01); *Y02E 60/76* (2013.01); *Y04S 40/22* (2013.01)

(58) Field of Classification Search
None
See application file for complete search history.

(56) References Cited

U.S. PATENT DOCUMENTS

| | | | | |
|---|---|---|---|---|
| 5,689,685 A | * | 11/1997 | Feldmann | G06F 17/5036 703/2 |
| 6,807,520 B1 | * | 10/2004 | Zhou | G06F 17/5022 703/14 |
| 7,774,725 B1 | * | 8/2010 | Jain | G06F 17/5036 703/14 |

(Continued)

OTHER PUBLICATIONS

Yang, Jianlei et al., "Fast Poisson Solver Preconditioned Method for Robust Power Grid Analysis", 2011, IEEE. (Year: 2011).*

(Continued)

*Primary Examiner* — Cedric Johnson
(74) *Attorney, Agent, or Firm* — Shami Messinger PLLC

(57) ABSTRACT

Systems and methods related to fast simulation of power delivery networks are described. A method is provided for simulating the time-domain responses of a plurality of points of a multi-layer power delivery network, comprising selecting a model of the power delivery network of a circuit, parsing the characteristic data describing the power delivery network, forming a circuit matrix relating to said circuit characteristic data, creating a preconditioner matrix with a specialized structure that allows solution by a Fast Transform solver, simulating the circuit using said circuit and preconditioner matrices by a computer, including a non-transitory computer readable storage medium and at least one processor, but preferably multiple processors, and reporting the responses at selected nodes and branches of the power delivery network.

37 Claims, 12 Drawing Sheets

(56) References Cited

U.S. PATENT DOCUMENTS

| | | | | |
|---|---|---|---|---|
| 8,065,129 | B1* | 11/2011 | Rahmat | G06F 17/5036 703/14 |
| 8,195,439 | B1* | 6/2012 | Hussain | G06F 17/5036 703/14 |
| 9,858,369 | B2 | 1/2018 | Daloukas et al. | |
| 2007/0157133 | A1* | 7/2007 | Cheng | G06F 17/5036 716/115 |

OTHER PUBLICATIONS

Feng, Zhuo et al., "Parallel On-Chip Power Distribution Network Analysis on Multi-Core-Multi-GPU Platforms", Oct. 2011, IEEE Transactions on Very Large Integration (VLSI) Systems, vol. 19, No. 10, IEEE. (Year: 2011).*

Ament, M. et al., "A Parallel Preconditioned Conjugate Gradient Solver for the Poisson Problem on a Multi-GPU Platform", 2010, 8th Euromicro Conference on Parallel, Distributed and Network-Based Processing, IEEE Computer Society. (Year: 2010).*

Zhou, Quming et al., "Large Power Grid Analysis Using Domain Decomposition", 2006, EDAA. (Year: 2006).*

Shi, Jin et al., "GPU Friendly Fast Poisson Solver for Structured Power Grid Network Analysis", Jul. 26-31, 2009, DAC '09, ACM. (Year: 2009).*

Daloukas, Konstantis et al., "Fast Transform-Based Preconditioners for Large-Scale Power Grid Analysis on Massively Parallel Architectures", Nov. 5-8, 2012, IEEE/ACM International Conference on Computer-Aided Design (ICCAD), ACM. (Year: 2012).*

Ament et al., "A Parallel Preconditioned Conjugate Gradient Solver for the Poisson Problem on a Multi-GPU Platform," 2010, 8th Euromicro Conference on Parallel, Distributed, and Network-Based Processing, IEEE Computer Society.

Chen et al., "Efficient Large-Scale Power Grid Analysis Based on Preconditioned Krylov-Subspace Iterative Methods", ACM/IEEE Design Automation Conf., 2001; p. 559.

Christara, "Quadratic Spline Collocation Methods for Elliptic Partial Differential Equations," BIT Numerical Mathematics, 34(1), 1994; pp. 33-61.

Feng et al, "Parallel On-Chip Power Distribution Network Analysis on Multi-Core-Multi-GPU Platforms," IEEE Trans. VLSI Syst., 19(10), 2011; pp. 1823-1836.

Feng et al., "Parallel Multigrid Preconditioning on Graphics Processing Units.{GPUs) for Robust Power Grid Analysis," ACM/IEEE Design Automation Conf., 2010; pp. 661-666.

Feng et al., "Parallel On-Chip Power Distribution Network Analysis on Multi-Core-Multi-GPU Platforms," Oct. 2011, IEEE Transactions on Very Large Integration (VLSI) Systems, vol. 19, No. 10, IEEE.

Kozhaya et al., "A Multigrid-Like Technique for Power Grid Analysis", IEEE Trans. Computer-Aided Design, 21(10), 2002; pp. 480-487.

Qian et al., "Fast Poisson Solvers for Thermal Analysis", IEEE/ACM Int. Conf Computer-Aided Design, 2010; pp. 598-702.

Quesada-Barriuso et al., "Selecting the Best Tridiagonal System Solver Projected on Multi-Core CPU and GPU Platforms," Int. Conf. on Parallel and Distributed Processing Techniques and Applications (as part of World Comp 2011 Conference); 7 pages.

Saad, "Iterative Methods for Sparse Linear Systems;" 567 pages.

Shi et al., "GPU friendly Fast Poisson Solver for Structured Power Grid Network Analysis", ACM/IEEE Design Automation Conf., 2009; pp. 178-183.

Shi et al., "Pattern-Based Iterative Method for Extreme Large Power/Ground Analysis," in IEEE Trans. Computer-Aided Design, 26(4), 2007; pp. 680-692.

Shi, Jin et al., "GPU Friendly Fast Poisson Solver for Structured Power Grid Network Anaylsis," Jul. 26-31, 2009, DAC '09, ACM.

Sun et al., "Parallel Domain Decomposition for Simulation of Large-Scale Power Grids", ACM/IEEE Design Automation Conf., 2007; pp. 54-59.

Van Loan, "Computational Frameworks for the Fast Fourier Transform," SIAM, 1992; 291 pages.

Yang et al., "Fast Poisson Solver Preconditioned Method for Robust Power Grid Analysis," 2011, IEEE.

Zhang et al., "Fast Triadiagonal Solvers on the GPU," ACM SIGPLAN Symposium on Principles and Practice of Parallel Programming, 2010; 10 pages.

Zhao et al., "Power Grid Analysis with Hierarchical Support Graphs", IEEE/ACM Int. Conf. on Computer-Aided Design, 2011; pp. 543-547.

Zhou et al., "Large Power Grid Analysis Using Domain Decomposition," 2006, EDAA.

Zhuo et al., "Power Grid Analysis and Optimization Using Algebraic Multigrid", in IEEE Trans. Computer-Aided Design, 27(4), 2008; pp. 738-751.

* cited by examiner

LARGE-SCALE POWER GRID ANALYSIS ON PARALLEL ARCHITECTURES

CLAIM OF PRIORITY

This application claims the benefit of priority to U.S. Patent Application titled "LARGE-SCALE POWER GRID ANALYSIS ON PARALLEL ARCHITECTURES", application Ser. No. 14/056,667, filed Oct. 17, 2013, and Provisional Patent Application titled "FAST TRANSFORM-BASED PRECONDITIONERS FOR LARGE-SCALE POWER GRID ANALYSIS ON MASSIVELY PARALLEL ARCHITECTURES", Application No. 61/715,499, filed Oct. 18, 2012, and both are incorporated herein by reference.

FIELD OF THE INVENTION

The invention relates to the field of circuit design and simulation, and specifically to fast simulation of large-scale power delivery networks utilizing preconditioners and parallel computing schemes.

BACKGROUND

The relentless push for high-performance and low-power integrated circuits has been met by aggressive technology scaling, which enabled the integration of a vast number of devices on the same die but brought new problems and challenges to the surface. The on-chip power delivery network (power grid) constitutes a vital subsystem of modern nanometer-scale ICs, since it affects in a critical way the performance and correct operation of the devices. In order to determine the quality of the supply voltage delivered to the devices, the designer has to perform static and dynamic simulation of the electrical circuit modeling the power grid. This has become a very challenging problem for contemporary ICs, since power grids encountered in these circuits are extremely large (comprising several thousands or millions of nodes) and very difficult to simulate efficiently (especially over multiple time-steps).

Static (DC) or transient simulation refers to the process of computing the response of an electrical circuit to a constant or time-varying stimulus. Since a power delivery network can be generally modeled as a linear RLC circuit, the process of DC or transient simulation of large-scale power grids amounts to solving very large (and sparse) linear systems of equations. Direct methods (based on matrix factorization) have been widely used in the past for solving the resulting linear systems, mainly because of their robustness in most types of problems. They also have the property of reusability of factorization results in transient simulation with a fixed time-step. Unfortunately, these methods do not scale well with the dimension of the linear system, and become prohibitively expensive for circuits beyond a few thousand elements, in both execution time and memory requirements. In addition, a fixed time-step is almost never used in practice because it becomes very inefficient to constantly simulate during long intervals of low activity. All practical implementations of integration techniques for ordinary differential equations (ODEs) employ a variable or adaptive time-step mechanism. In those cases, the reusability of matrix factorization in direct methods ceases to exist.

Iterative methods involve only inner products and matrix-vector products, and constitute a better alternative for large sparse linear systems in many respects, being more computationally- and memory-efficient. This holds even more so for modern non-stationary iterative methods which fall under the broad class of 'Krylov-subspace' methods. See e.g. Y. Saad, "Iterative Methods for Sparse Linear Systems", Chapter 6, which is incorporated herein by reference in its entirety. Iterative methods possess themselves a kind of reusability property for transient simulation, in that the solution at the last time-step provides an excellent initial guess for the next time-step, thus making a properly implemented iterative method converge in a fairly small number of iterations. In fact, this property also holds in the case of a variable time-step, since the quality of the last solution as initial guess for the next solution is not affected. The above features make iterative methods much more suitable for DC and variable time-step transient analysis of large-scale linear circuits such as power distribution networks.

The main problem of iterative methods is their unpredictable rate of convergence which depends greatly on the properties (specifically the condition number) of the circuit matrix. A preconditioning mechanism, which transforms the linear system into one with more favorable properties, is essential to guarantee fast and robust convergence. However, the ideal preconditioner (one that approximates the circuit matrix well and is inexpensive to construct and apply) differs according to each particular problem and each different type of circuit matrix. That is why iterative methods have not reached the maturity of direct methods and have not yet gained widespread acceptance in linear circuit simulation. Although general-purpose preconditioners (such as incomplete factorizations or sparse approximate inverses) have been developed, they are not tuned to any particular simulation problems and cannot improve convergence by as much as specially-tailored preconditioners.

Another aspect of circuit simulation that has become very important recently is to uncover hidden opportunities for parallelism in its intermediate steps. This is essential for harnessing the potential of contemporary parallel architectures, such as multi-core processors and graphics processing units (GPUs). GPUs, in particular, are massively parallel architectures whose computational power is about 1580 GFlops/s (in 2012), greater by an order of magnitude than that of multi-core processors, and as a result they appear as a platform of choice for the efficient execution of computationally-intensive tasks. However, there has been little systematic research for the development of parallel simulation algorithms, and more specifically algorithms for power grid analysis that can be mapped onto massively parallel architectures. This can be attributed in part to the difficulty in parallelization of direct linear solution methods that have been mostly employed thus far.

On the contrary, Krylov-subspace iterative methods offer ample possibilities for parallelism that have been explored sufficiently well. However, the construction and application of the preconditioner is a very delicate part of parallelizing an iterative method because it is completely application-dependent (and traditional general-purpose preconditioners have very little room for parallelism).

The growing need to simulate large power grids with small memory footprint and efficient parallel execution has led many researchers to deviate from the standard practice of direct factorization methods and present more suitable iterative methods. This has been studied in the past in several paper, including T.-H. Chen and C. C.-P. Chen, "Efficient Large-Scale Power Grid Analysis Based on Preconditioned Krylov-Subspace Iterative Methods", *ACM/IEEE Design Automation Conf.*, 2001; and J. Shi, Y. Cai, S. X.-D. Tan, J. Fan, and X. Hong, "Pattern-Based Iterative Method for Extreme Large Power/Ground Analysis", in *IEEE Trans. Computer-Aided Design*, 26(4):680-692, 2007, each incorporated herein by reference in their entirety, that have proposed iterative solvers for efficient simulation of power delivery networks. Power grid analysis was first formulated as a symmetric positive definite system to be solved by PCG in Chen et al. (cited above), but the preconditioner used was a general-purpose (and inefficient for specialized applications) known as incomplete Cholesky.

A different pattern-based preconditioner was proposed in Shi et al. (cited above), but it is very simple and heuristic and does not appear to reduce the number of iterations significantly. The idea of multi-grid techniques for solving partial differential equations has been proposed for power grid analysis in the past in several papers, including J. Kozhaya, S. Nassif, and F. Najm, "A Multigrid-Like Technique for Power Grid Analysis", *IEEE Trans. Computer-Aided Design*, 21(10):1148-1160, 2002; and C. Zhuo, J. Hu, M. Zhao, and K. Chen, "Power Grid Analysis and Optimization Using Algebraic Multigrid", in *IEEE Trans. Computer-Aided Design*, 27(4):738-751, 2008, each incorporated herein by reference in their entirety.

More recently, parallel computing architectures have been utilized to accelerate power grid analysis in several papers, including K. Sun, Q. Zhou, K. Mohanram, and D. C. Sorensen, "Parallel Domain Decomposition for Simulation of Large-Scale Power Grids", *ACM/IEEE Design Automation Conf.*, 2007; J. Shi, Y. Cai, W. Hou, L. Ma, S. X.-D. Tan, P.-H. Ho, and X. Wang, "GPU friendly Fast Poisson Solver for Structured Power Grid Network Analysis", *ACM/IEEE Design Automation Conf.*, 2009; and Z. Feng and Z. Zeng, "Parallel Multigrid Preconditioning on Graphics Processing Units (GPUs) for Robust Power Grid Analysis", *ACM/IEEE Design Automation Conf.*, 2010, each incorporated herein by reference in their entirety.

Authors in Feng et al. (cited above) propose multi-grid as a solution method for power grid analysis and they use multi-core and massively parallel single-instruction multiple-thread (SIMT) platforms to tackle power grid analysis, while authors in Shi et al. (cited above) formulate the traditional linear system as a special two-dimension Poisson equation and solve it using analytical expressions based on the FFT algorithm, with GPUs being used to further speed up the algorithm. However, both approaches only solve very regular grid structures with specialized techniques, which can limit their effectiveness for irregular power delivery networks that are found in late design stages.

Preconditioning has been studied as a method for efficiently tackling the electrical and thermal analysis of large-scale and irregular power grid designs in several papers in the past, including and Z. Feng, Z. Zeng, and P. Li, "Parallel On-Chip Power Distribution Network Analysis on Multi-Core-Multi-GPU Platforms", *IEEE Trans. VLSI Syst.*, 19(10):1823-1836, 2011; J. Yang, Y. Cai, Q. Zhou, and J. Shi, "Fast Poisson Solver Preconditioned Method for Robust Power Grid Analysis", *IEEE/ACM Int. Conf. on Computer-Aided Design*, 2011; and H. Qian and S. Sapatnekar, "Fast Poisson Solvers for Thermal Analysis", *IEEE/ACM Int. Conf. Computer-Aided Design*, 2010, each incorporated herein by reference in their entirety. In Feng et al. (cited above), the preconditioning has been carried out by multi-grid techniques. However, when used as preconditioner for iterative methods, multigrid is not very efficient because it is an iterative method by itself, and also solves a system approximately which can hinder the convergence of PCG. Moreover, some operations of multigrid are not always well-defined (e.g. mapping by interpolation from coarser to finer grids and vice versa, and correction of solutions), and the construction of approximate matrices for all coarser grids is an expensive setup phase which has to be repeated every time the system is reconstructed in each time-step change during transient analysis.

SUMMARY

Embodiments of the present invention are related to fast simulation of large-scale power delivery networks utilizing Fast Transform-based preconditioners.

In accordance with an embodiment, a method is provided for fast simulation of large-scale power delivery networks, comprising selecting a model of a multi-layer power delivery network of a circuit, parsing the characteristic data describing the power delivery network, forming a circuit matrix relating to said circuit characteristic data, creating a preconditioner matrix with a specialized structure that allows solution by a Fast Transform solver, simulating the circuit using said circuit and preconditioner matrices by a computer, including a non-transitory computer readable storage medium and processor, and reporting the voltage response at each of a plurality of nodes of the power delivery network.

In accordance with another preferred embodiment, the input netlist that describes the power delivery network contains geometry information for each node of the network.

In accordance with another preferred embodiment, the preconditioner matrix that is created is based on a regular power delivery network, which is obtained after a regularization step of the initial power delivery network, and has a specialized structure that allows for solution by a Fast Transform solver.

In accordance with another preferred embodiment, the methods described in the present invention can be executed on parallel processing architectures (such as multi-core processors, graphic processing units—GPUs—and networked computer clusters).

BRIEF DESCRIPTION OF THE DRAWINGS

Embodiments of the invention will now be described, by way of example only, with reference to the accompanying drawings in which.

DETAILED DESCRIPTION

Figure 1:
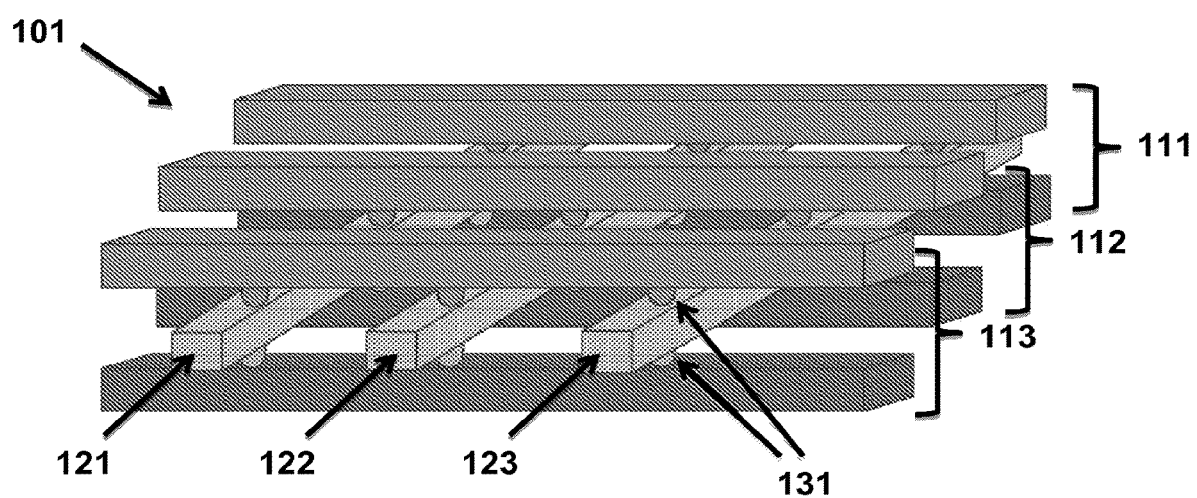
FIG. 1 illustrates the geometry structure of a 3D power grid with 3 layers. Vias provide connections between adjacent metal layers.

The following description is of the best modes presently contemplated for practicing various embodiments of the present invention. The description is not to be taken in a limiting sense but is made merely for the purpose of describing the general principles of the invention. The scope of the invention should be ascertained with reference to the claims. In the description of the invention that follows, like numerals or reference designators will be used to refer to like parts or elements throughout.

It would be apparent to one of skill in the art that the present invention, as described below, may be implemented in many different embodiments of hardware, software, firmware, and/or the entities illustrated in the figures. Any actual software, firmware and/or hardware described herein is not limiting of the present invention. Thus, the operation and behavior of the present invention will be described with the understanding that modifications and variations of the embodiments are possible, given the level of detail presented herein.

This invention relates to a method and system for simulating large-scale power delivery networks that overcomes limitations in the prior art and offers significant performance improvements.

Our approach for preconditioning, based on the application of a Fast Transform, involves a much more straightforward and inexpensive implementation and reconstruction phase for transient simulation over prior art methods, while it also provides analytical solution of the preconditioned system (which is actually a fast direct method).

The approach in Yang et al. (cited above) uses a Fast Poisson-based preconditioner to accelerate the convergence rate of Conjugate Gradient. However, the Yang et al. technique is based on the presumed existence of special areas in the grid with zero voltage drop as boundary condition, in order to formulate so-called "Poisson blocks" with Toeplitz matrix structure. As will be demonstrated below, our invention does not necessitate such an assumption.

In the same context, research paper X. Zhao, J. Wang, Z. Feng, and S. Hu, "Power Grid Analysis with Hierarchical Support Graphs", *IEEE/ACM Int. Conf. on Computer-Aided Design,* 2011, incorporated herein by reference in its entirety presents a support graph-based preconditioner that can provide a significant acceleration to the convergence rate of an iterative method. However, applying this preconditioner requires the solution of a triangular system which can hinder preconditioner's applicability on parallel architectures due to the limited parallelism of triangular solution algorithms.

On the contrary, applying a Fast Transform preconditioner as per a preferred embodiment of this invention has far greater potential for parallelism than either multigrid or triangular solution algorithms, especially on GPUs. This has been studied in a paper by M. Ament, G. Knittel, D. Weiskopf, and W. Strasser, "A Parallel Preconditioned Conjugate Gradient Solver for the Poisson Problem on a Multi-GPU Platform", *Euromicro Conference on Parallel, Distributed and Network-based Processing,* 2010, incorporated herein by reference in its entirety.

We present below a method according to this invention, which provides the benefits of Fast Transform-based preconditioning over prior art methods such as multigrid, while overcoming the above stated limitations of Fast Poisson-based preconditioners.

Power Grid Modeling and Transient Analysis: We place specific emphasis on transient analysis with a variable time-step, although those skilled in the art shall appreciate that the results are perfectly applicable in DC analysis as well. The typical model of a power grid for transient analysis is obtained (usually by a layout extraction tool) by modeling each wire segment (between two contacts) as a resistance in series with an inductance, and with capacitances to ground at both contact nodes. Let the electrical model of the power grid be composed of b composite R-L branches and N non-supply nodes.

By using the Modified Nodal Analysis (MNA) framework in such a linear circuit, we obtain the following system of differential equations [4]:

$$\tilde{G}x(t) + \tilde{C}\dot{x}(t) = e(t) \quad (1)$$

where $$\tilde{G} = \begin{bmatrix} 0 & A_{rl} \\ -A_{rl}^T & R_b \end{bmatrix} \quad (2)$$

$$\tilde{C} = \begin{bmatrix} C_n & 0 \\ 0 & L_b \end{bmatrix} \quad (3)$$

$$x(t) = \begin{bmatrix} v_n(t) \\ i_b(t) \end{bmatrix} \quad (4)$$

$$e(t) = \begin{bmatrix} e_n(t) \\ 0 \end{bmatrix} \quad (5)$$

In the above system, $A_{rl}$ is the N×b incidence matrix of the directed composite R-L branches (with elements $\alpha_{ij}=\pm 1$ or $\alpha_{ij}=0$ depending on whether branch j leaves/enters or is not incident with node i), $v_n(t)$, $i_b(t)$ are the N×1 and b×1 vectors of node voltages and branch currents respectively, $e_n(t)$ is a N×1 vector of excitations from independent sources at the nodes, $C_n$ is a N×N diagonal matrix of the node capacitances, and $R_b$, $L_b$ are diagonal b×b matrices of the resistances and self-inductances of the composite R-L branches. Using the Backward-Euler approximation we obtain from eq. (1) the following discretized system of linear algebraic equations:

$$\left(\tilde{G} + \frac{\tilde{C}}{h_k}\right)x(h_k) = e(h_k) + \frac{\tilde{C}}{h_k}x(h_{k-1}) \quad (6)$$

where $h_k$, k=1, is the chosen time-step that may in general vary during the analysis. By block-matrix operations on the above system we obtain the following system of coupled recursive equations, as described in Chen et al. (cited above):

$$\left(A_{rl}\left(R_b + \frac{L_b}{h_k}\right)^{-1}A_{rl}^T + \frac{C_n}{h_k}\right)v_n(h_k) = \quad (7)$$

$$\frac{C_n}{h_k}v_n(h_{k-1}) - \left(A_{rl}\left(R_b + \frac{L_b}{h_k}\right)^{-1}\frac{L_b}{h_k}i_b(h_{k-1}) + e(h_k)\right)$$

$$i_b(h_k) = \left(R_b + \frac{L_b}{h_k}\right)^{-1}\frac{L_b}{h_k}i_b(h_{k-1}) + \left(R_b + \frac{L_b}{h_k}\right)^{-1}A_{rl}^T v_n(h_k) \quad (8)$$

At each time-step $h_k$ we have to solve the N×N linear system eq. (7) with circuit matrix $$A \equiv A_{rl}\left(R_b + \frac{L_b}{h_k}\right)^{-1} A_{rl}^T + \frac{C_n}{h_k}$$

and then find branch currents from eq. (8). If we neglect inductances and model the grid as an RC circuit, the system from eq. (3) reduces to the following recursive system:

$$\left(A_{rl} R_b^{-1} A_{rl}^T + \frac{C_n}{h_k}\right) v_n(h_k) = \frac{C_n}{h_k} v_n(h_{k-1}) + e(h_k) \quad (9)$$

In both the above cases, the circuit matrix can be shown to be Symmetric and Positive Definite (SPD), which means that efficient direct or iterative methods such as the Cholesky factorization or the method of Conjugate Gradients can be employed for its solution.

Iterative Linear Solution Methods:

The method of Conjugate Gradients constitutes a very attractive method for solving large SPD linear systems from a computational and memory usage perspective. It involves only inner products and matrix-vector products, while it only needs to keep 4 vectors in memory during its execution (due to a property of short recurrences). It also scales well with the dimension of the system and is a very good candidate for mapping onto parallel architectures. However, the convergence rate of CG is not predictable in its plain (non-preconditioned) form, which limits its adoption in the simulation of industrial and large-scale designs.

Regarding the convergence rate of CG, the required number of iterations (for a given initial guess and convergence tolerance) is bounded in terms of the spectral condition number $\kappa_2(A) = \|A\|_2 \|A^{-1}\|_2 \geq 1$—specifically, it is $O(\sqrt{\kappa_2(A)})$, which for SPD matrices becomes $$\kappa_2(A) = \frac{\lambda_{max}(A)}{\lambda_{min}(A)}$$

where $\lambda_{max}(A)$, $\lambda_{min}(A)$ are the maximum and minimum eigenvalues of A respectively. This means that convergence of CG is fast when $\kappa_2(A) \approx 1$ and slow when $\kappa_2(A) \gg 1$.

Preconditioning is a technique which is used to transform the original linear system into one with more favorable spectral properties, and is essential for guaranteeing fast and robust convergence of CG. Algorithm 1 below describes the Preconditioned Conjugate Gradient method for the solution of an SPD linear system Ax=b. The preconditioner solve step Mz=r in every iteration (line 6) effectively modifies the CG algorithm to solve the system $M^{-1}Ax=M^{-1}b$, which has the same solution as the original one Ax=b. If M approximates A in some way, then $M^{-1} \Box A^{-1}$ and $\kappa_2(M^{-1}A) \approx \kappa_2(I) = 1$, which makes the CG converge quickly. So the motivation behind preconditioning is to find a matrix M with the following properties: 1) the convergence rate of the preconditioned system $M^{-1}Ax=M^{-1}b$ is fast, and 2) a linear system involving M (i.e. Mz=r) can be solved much more efficiently than the original system involving A (i.e. Ax=b).

| Algorithm 1. Preconditioned Conjugate Gradients method: |
|---|
| 1.  x = initial guess $x^{(0)}$ |
| 2.  r = b − Ax |
| 3.  iter = 0 |

| Algorithm 1. Preconditioned Conjugate Gradients method: |
|---|
| 4.  repeat |
| 5.  iter = iter + 1 |
| 6.  Solve Mz = r (Preconditioner Solve Step) |
| 7.  ρ = r · z |
| 8.  if iter == 1 then |
| 9.  p = z |
| 10. else |
| 11. β = ρ/ρ1 |
| 12. p = z + βp |
| 13. end |
| 14. ρ1 = ρ |
| 15. q = Ap |
| 16. α = ρ/(p · q) |
| 17. x = x + αp |
| 18. r = r − αq |
| 19. until convergence |

In general, the condition number $\kappa_2(A)$ and the number of iterations grows as a function of the matrix dimension N. It can be very beneficial if the circuit matrix A can be approximated well enough by a preconditioner M, so that $\kappa_2(M^{-1}A)$ and the number of iterations become independent of the dimension (i.e. they are bounded by a constant, O(1)), and at the same time the solution of the preconditioned systems Mz=r (which then effectively receives the whole burden of the algorithm) can be performed in O(N) or slightly higher number of operations. In that case the performance of PCG will be optimal or very close to optimal. The effect of good preconditioning is even more pronounced if the operations for the solution of Mz=r can be performed in parallel. Matrices arising from power grids can be well-approximated by preconditioners with special structure such that the number of iterations becomes bounded (or very slowly rising), while the systems Mz=r can be solved by applying a Fast Transform in a near-optimal number of operations in a sequential implementation, and even less operations in a parallel environment (owing to the large parallel potential of Fast Transforms as well as other parallelization opportunities). The next section describes the special form of the preconditioner matrices, and the solution of the corresponding linear systems Mz=r by a Fast Transform.

Fast Transform Solvers for 2D Networks:

Let M be a N×N block-tridiagonal matrix with m blocks of size n×n each (overall N=m·n), which has the following form:

$$M = \begin{bmatrix} T_1 & \gamma_1 I & & & \\ \gamma_1 I & T_2 & \gamma_2 I & & \\ & \cdots & \cdots & \cdots & \\ & & \gamma_{m-2} I & T_{m-1} & \gamma_{m-1} I \\ & & & \gamma_{m-1} I & T_m \end{bmatrix} \quad (10)$$

where I is the n×n identity matrix and $T_i$, i=1, ..., m, are n×n tridiagonal matrices of the form:

$$T_i = \begin{bmatrix} \alpha_i + \beta_i & -\alpha_i & & & \\ -\alpha_i & 2\alpha_i + \beta_i & -\alpha_i & & \\ & \cdots & \cdots & \cdots & \\ & & -\alpha_i & 2\alpha_i + \beta_i & -\alpha_i \\ & & & -\alpha_i & \alpha_i + \beta_i \end{bmatrix} \quad (11)$$

-continued $$= \alpha_i \begin{bmatrix} 1 & -1 & & & \\ -1 & 2 & -1 & & \\ & \cdots & \cdots & \cdots & \\ & & -1 & 2 & -1 \\ & & & -1 & 1 \end{bmatrix} + \beta_i I$$

We will describe an algorithm for the solution of a linear system $Mz=r$ with matrix M of the form from eq. (10), by the use of a Fast Transform solver in $O(mn \log n)=O(N \log n)$ operations. Such a solution is based on the fact that the eigen-decomposition of the tridiagonal matrices $T_i$ is known beforehand, and that the matrices of eigenvectors that diagonalize $T_i$ are matrices that correspond to a Fast Transform. More specifically, it can be shown (as described in paper C. C. Christara, "Quadratic Spline Collocation Methods for Elliptic Partial Differential Equations", *BIT Numerical Mathematics*, 34(1):33-61, 1994, incorporated herein by reference in its entirety) that each $T_i$ has n distinct eigenvalues, $\lambda_{i,j}$, $j=1, \ldots, n$, which are given by:

$$\lambda_{i,j} = \beta_i + 4\alpha_i \sin^2 \frac{(j-1)\pi}{2n} = \beta_i + \alpha_i \left( 2\cos \frac{(j-1)\pi}{n} - 2 \right) \quad (12)$$

as well as a set of n orthonormal eigenvectors $q_j$, $j=1, \ldots, n$, with elements:

$$q_{j,k} = \begin{cases} \sqrt{\frac{1}{n}} \cos \frac{(2k-1)(j-1)\pi}{2n} & j=1, k=1, \ldots, n \\ \sqrt{\frac{2}{n}} \cos \frac{(2k-1)(j-1)\pi}{2n} & j=2, \ldots, n, k=1, \ldots, n \end{cases} \quad (13)$$

Note that the $q_j$ do not depend on the values of $\alpha_i$ and $\beta_i$, and are the same for every matrix $T_i$. If $Q=[q_1, \ldots, q_n]$ denotes the matrix whose columns are the eigenvectors $q_j$, then due to the eigen-decomposition of $T_i$ we have $Q^T T_i Q = \Lambda_i = \text{diag}(\lambda_{i,1}, \ldots, \lambda_{i,n})$. By exploiting this diagonalization of the matrices $T_i$, the system $Mz=r$ with M of the form of eq. (10) is equivalent to the following system (due to $Q^T Q = I$):

$$\begin{bmatrix} Q^T & & \\ & \ddots & \\ & & Q^T \end{bmatrix} [M] \begin{bmatrix} Q & & \\ & \ddots & \\ & & Q \end{bmatrix} \begin{bmatrix} Q^T & & \\ & \ddots & \\ & & Q^T \end{bmatrix} z = \begin{bmatrix} Q^T & & \\ & \ddots & \\ & & Q^T \end{bmatrix} r \Leftrightarrow \quad (14)$$

$$\begin{bmatrix} \Lambda_1 & \gamma_1 I & & & \\ \gamma_1 I & \Lambda_2 & \gamma_2 I & & \\ & \cdots & \cdots & \cdots & \\ & & \gamma_{m-2} I & \Lambda_{m-1} & \gamma_{m-1} I \\ & & & \gamma_{m-1} I & \Lambda_m \end{bmatrix} \tilde{z} = \tilde{r} \quad (15)$$

where $$\tilde{z} = \begin{bmatrix} Q^T & & \\ & \ddots & \\ & & Q^T \end{bmatrix} z, \tilde{r} = \begin{bmatrix} Q^T & & \\ & \ddots & \\ & & Q^T \end{bmatrix} r \quad (16)$$

If the $N \times 1$ vectors $r$, $z$, $\tilde{r}$, $\tilde{z}$ are also partitioned into m blocks of size $n \times 1$ each, i.e.

$$r = \begin{bmatrix} r_1 \\ \vdots \\ r_m \end{bmatrix}, z = \begin{bmatrix} z_1 \\ \vdots \\ z_m \end{bmatrix}, \tilde{r} = \begin{bmatrix} \tilde{r}_1 \\ \vdots \\ \tilde{r}_m \end{bmatrix}, \tilde{z} = \begin{bmatrix} \tilde{z}_1 \\ \vdots \\ \tilde{z}_m \end{bmatrix} \quad (17)$$

then we have: $\tilde{r}_i = Q^T r_i$ and $\tilde{z}_i = Q^T z_i \Leftrightarrow z_i = Q\tilde{z}_i$, $i=1, \ldots, m$.

Each product $Q^T r_i = \tilde{r}_i$ corresponds to a Discrete Cosine Transform of type-II (DCT-II) on $r_i$, and each product $Q\tilde{z}_i = z_i$ corresponds to an Inverse Discrete Cosine Transform of type-II (IDCT-II) on $\tilde{z}_i$. This means that the computation of the whole vector $\tilde{r}$ from $r$ amounts to m independent DCT-II transforms of size n, and the computation of the whole vector $z$ from $\tilde{z}$ amounts to m independent IDCT-II transforms of size n. A modification of Fast Fourier Transform (FFT) can be employed for each of the m independent DCT-II/IDCT-II transforms, giving a total operation count of $O(mn \log n) = O(N \log n)$.

If now P is a permutation matrix that reorders the elements of a vector or the rows of a matrix as 1, n+1, 2n+1, ..., (m−1)n+1, 2, n+2, 2n+2, ..., (m−1)n+2, ..., n, n+n, 2n+n, ..., (m−1)n+n, and $P^T$ is the inverse permutation matrix, then the system of eq. (15) is further equivalent to:

$$P \begin{bmatrix} \Lambda_1 & \gamma_1 I & & & \\ \gamma_1 I & \Lambda_2 & \gamma_2 I & & \\ & \cdots & \cdots & \cdots & \\ & & \gamma_{m-2} I & \Lambda_{m-1} & \gamma_{m-1} I \\ & & & \gamma_{m-1} I & \Lambda_m \end{bmatrix} P^T P \tilde{z} = P \tilde{r} \Leftrightarrow \quad (18)$$

$$\begin{bmatrix} \tilde{T}_1 & & & \\ & \tilde{T}_2 & & \\ & & \ddots & \\ & & & \tilde{T}_n \end{bmatrix} \tilde{z}^P = \tilde{r}^P \quad (19)$$

where $$\tilde{T}_j = \begin{bmatrix} \lambda_{1,j} & \gamma_1 & & & \\ \gamma_1 & \lambda_{2,j} & \gamma_2 & & \\ & \cdots & \cdots & \cdots & \\ & & \gamma_{m-2} & \lambda_{m-1,j} & \gamma_{m-1} \\ & & & \gamma_{m-1} & \lambda_{m,j} \end{bmatrix} \quad (20)$$

and $\tilde{z}^P = P\tilde{z}$, $\tilde{r}^P = P\tilde{r}$. If the $N \times 1$ vectors $\tilde{z}^P$, $\tilde{r}^P$ are partitioned into n blocks $\tilde{z}_j^P$, $\tilde{r}_j^P$ of size $m \times 1$ each, then the system of eq. (19) effectively represents n independent tridiagonal systems $\tilde{T}_j \tilde{z}_j^P = \tilde{r}_j^P$ of size m which can be solved w.r.t. the blocks $\tilde{z}_j^P$, $j=1, \ldots, n$ (to produce the whole vector $\tilde{z}^P$) in a total of $O(mn) = O(N)$ operations. For each such system the coefficient matrix of eq. (20) is known beforehand and is determined exclusively by the eigenvalues of eq. (12) and the values $\gamma_i$ of matrix M, while the right-hand side (RHS) vector $\tilde{z}_j^P$ is composed of specific components of (DCT-II)-transformed blocks of vector r. The equivalence of the system $Mz=r$, with M as in eq. (10), to the system of eq. (19) gives a procedure for fast solution of $Mz=r$ which is described in Algorithm 2 below.

Figure 7:
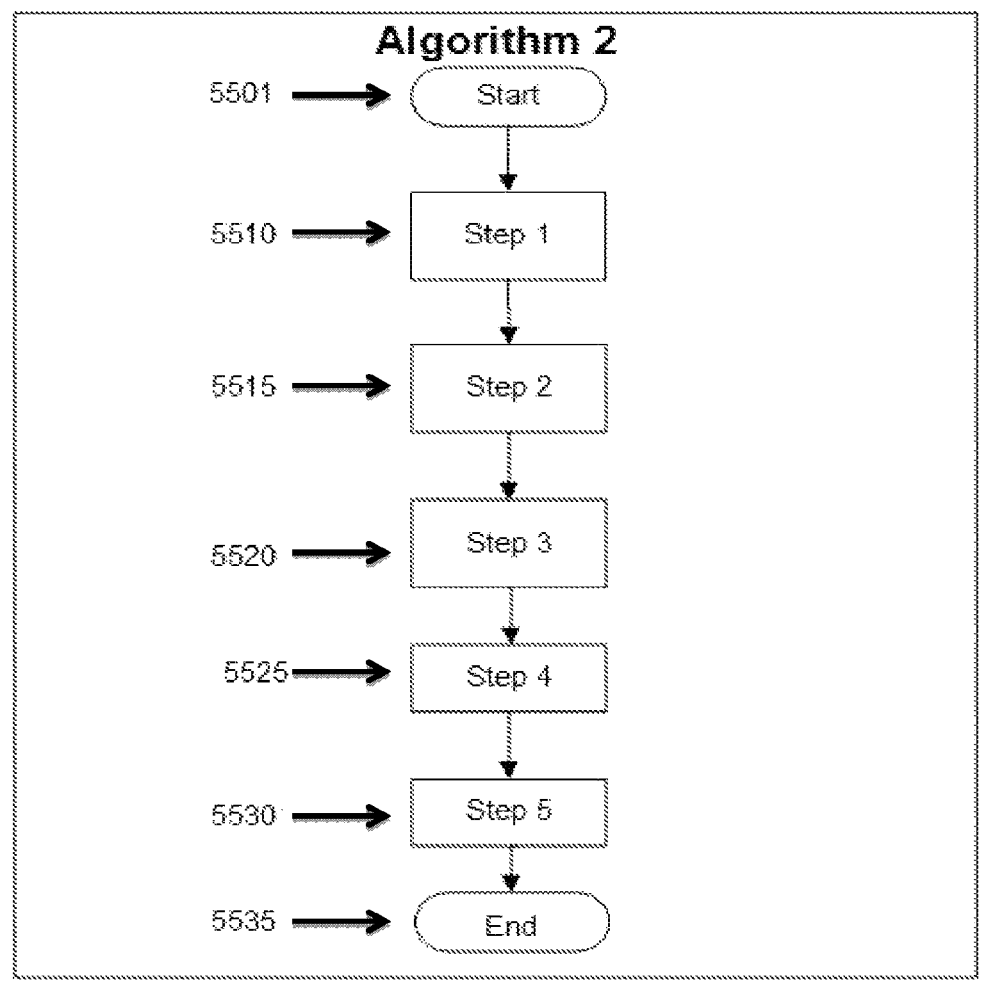
FIG. 7 presents the flow of a preferred method for solving the preconditioner that corresponds to the 2D regular grid.

Algorithm 2 (presented in FIG. 7). We describe a Fast Transform algorithm, according to an embodiment, for the preconditioner solve step $Mz=r$, where M is of the form of eq. (10):

1. Partition the RHS vector r into m blocks $r_i$ of size n, and perform DCT-II transform $(Q^T r_i)$ on each block to obtain transformed vector $\tilde{z}$ 2. Permute vector $\tilde{z}$ by permutation P, which orders elements as $1, n+1, \ldots, (m-1)n+1, 2, n+2, \ldots, (m-1)n+2, \ldots, n, n+n, \ldots, (m-1)n+n$, in order to obtain vector $\tilde{r}^P$
3. Solve the n tridiagonal systems as in eq. (19) with known coefficient matrices from eq. (20), in order to obtain vector $\tilde{z}^P$.
4. Apply inverse permutation $P^T$ on vector $\tilde{z}^P$ so as to obtain vector $\tilde{z}$.
5. Partition vector $\tilde{z}$ into m blocks $\tilde{z}_i$ of size n, and perform IDCT-II transform ($Q\tilde{z}_i$) on each block to obtain final solution vector z.

Fast Transform Solvers for 3D Networks:

The methodology above under "Fast Transform Solvers for 2D Networks" can be extended and applied for the solution of 3D networks. Let M be a N×N block-tridiagonal matrix with l blocks of size mn×mn each (overall N=l·m·n), where l is very small (typically between 2 and 8), since for power grid matrices it corresponds to the number of metal layers. For ease of presentation we will assume l=4 in the following, but the development is perfectly generalizable to an arbitrary number l. In particular, matrix M has the following form:

$$M = \begin{bmatrix} M_1 & \gamma_1 I_{mn} & & \\ \gamma_1 I_{mn} & M_2 & \gamma_2 I_{mn} & \\ & \gamma_2 I_{mn} & M_3 & \gamma_3 I_{mn} \\ & & \gamma_3 I_{mn} & M_4 \end{bmatrix} \quad (21)$$

where $I_{mn}$ is the mn×mn identity matrix, and $M_i$, i=1, 2, 3, 4, are alternating block-diagonal and block-tridiagonal mn×mn matrices with m blocks of size n×n which have the forms:

$$M_i = \mathrm{diag}(T_i, \ldots, T_i), \; i = 1, 3 \quad (22)$$

$$M_i = \begin{bmatrix} (\alpha_i + \beta_i)I_n & -\alpha_i I_n & & & \\ -\alpha_i I_n & (\alpha_i + \beta_i)I_n & -\alpha_i I_n & & \\ & \ldots & \ldots & \ldots & \\ & & & (2\alpha_i + \beta_i)I_n & -\alpha_i I_n \\ & & & -\alpha_i I_n & (\alpha_i + \beta_i)I_n \end{bmatrix}, \quad (23)$$

$i = 2, 4$ where $I_n$ is the n×n identity matrix, and T, i=1, 3 have the form of eq. (11). Thus, the eigenvalues and eigenvectors of the diagonal blocks of $M_i$, i=1, 3 are the same as those of $T_i$ and are given by eq. (12) and eq. (13) respectively. By a similar reasoning as in eq. (15), the linear system Mz=r with M of the form of eq. (21) is equivalent to the following:

$$\begin{bmatrix} Q_n^T & & \\ & \ddots & \\ & & Q_n^T \end{bmatrix} M \begin{bmatrix} Q_n & & \\ & \ddots & \\ & & Q_n \end{bmatrix} \begin{bmatrix} Q_n^T & & \\ & \ddots & \\ & & Q_n^T \end{bmatrix} z = \begin{bmatrix} Q_n^T & & \\ & \ddots & \\ & & Q_n^T \end{bmatrix} r \Leftrightarrow \quad (24)$$

$$M = \begin{bmatrix} \tilde{M}_1 & \gamma_1 I_{mn} & & \\ \gamma_1 I_{mn} & M_2 & \gamma_2 I_{mn} & \\ & \gamma_2 I_{mn} & \tilde{M}_3 & \gamma_3 I_{mn} \\ & & \gamma_3 I_{mn} & M_4 \end{bmatrix} \tilde{z} = \tilde{r} \quad (25)$$

where $\tilde{M}_i = \mathrm{diag}(\Lambda_i, \ldots, \Lambda_i)$, i=1, 3, and $$\tilde{z} = \begin{bmatrix} Q_n^T & & \\ & \ddots & \\ & & Q_n^T \end{bmatrix} z, \; \tilde{r} = \begin{bmatrix} Q_n^T & & \\ & \ddots & \\ & & Q_n^T \end{bmatrix} r \quad (26)$$

If the N×1 vectors r, z, $\tilde{r}$, $\tilde{z}$ are themselves partitioned into lm sub-vectors (blocks) of size n×1 each, i.e.

$$r = \begin{bmatrix} r_1 \\ \vdots \\ r_{lm} \end{bmatrix}, z = \begin{bmatrix} z_1 \\ \vdots \\ z_{lm} \end{bmatrix}, \tilde{r} = \begin{bmatrix} \tilde{r}_1 \\ \vdots \\ \tilde{r}_{lm} \end{bmatrix}, \tilde{z} = \begin{bmatrix} \tilde{z}_1 \\ \vdots \\ \tilde{z}_{lm} \end{bmatrix} \quad (27)$$

then we have $\tilde{r}_i = Q_n^T r_i$, and $\tilde{z}_i = Q_n^T z_i \Leftrightarrow z_i = Q_n \tilde{z}_i$, $i=1, \ldots, lm$. If P is again the permutation matrix of size mn×mn that reorders the elements of a vector or the rows of a matrix as $1, n+1, \ldots, (m-1)n+1, 2, n+2, \ldots, (m-1)n+2, \ldots, n, n+n, \ldots, (m-1)n+n$, and $P_1$, $P_1^T$ denote the block-diagonal N×N permutation matrices $P_1 = \mathrm{diag}(P, P, P, P)$ and $P_1^T = \mathrm{diag}(P^T, P^T, P^T, P^T)$ then the system from eq. (25) is further equivalent to:

$$P_1 \begin{bmatrix} \tilde{M}_1 & \gamma_1 I_{mn} & & \\ \gamma_1 I_{mn} & M_2 & \gamma_2 I_{mn} & \\ & \gamma_2 I_{mn} & \tilde{M}_3 & \gamma_3 I_{mn} \\ & & \gamma_3 I_{mn} & M_4 \end{bmatrix} P_1^T P_1 \tilde{z} = P_1 \tilde{r} \Leftrightarrow \quad (28)$$

$$\begin{bmatrix} D_1 & \gamma_1 I_{mn} & & \\ \gamma_1 I_{mn} & D_2 & \gamma_2 I_{mn} & \\ & \gamma_2 I_{mn} & D_3 & \gamma_3 I_{mn} \\ & & \gamma_3 I_{mn} & D_4 \end{bmatrix} \tilde{z}^{P_1} = \tilde{r}^{P_1} \quad (29)$$

where $$D_i = \mathrm{diag}(\lambda_{i,1} I_m, \ldots, \lambda_{i,n} I_m), \; i = 1, 3 \quad (30)$$
$$D_i = \mathrm{diag}(T_i, \ldots, T_i), \; i = 2, 4$$

and $\tilde{z}^{P_1} = P_1 \tilde{z}$, $\tilde{r}^{P_1} = P_1 \tilde{r}$. In the above, $T_i$, i=2, 4, are m×m tridiagonal matrices of the form of eq. (11), each having m distinct eigenvalues as in eq. (12) (with m in place of n), and m orthonormal eigenvectors as in eq. (13) (with m in place of n). If $Q_m = [q_1, \ldots, q_m]$ is the common matrix of eigenvectors for $T_i$, i=2, 4, and $Q_m^T T_i Q_m = \Lambda_i \mathrm{diag}(\lambda_{i,1}, \ldots, \lambda_{i,m})$ is the corresponding diagonalization, then the system of eq. (29) is further equivalent to:

$$\begin{bmatrix} Q_n^T & \\ & Q^T \end{bmatrix} \begin{bmatrix} D_1 & \gamma_1 I_{mn} & & \\ \gamma_1 I_{mn} & D_2 & \gamma_2 I_{mn} & \\ & \gamma_2 I_{mn} & D_3 & \gamma_3 I_{mn} \\ & & \gamma_3 I_{mn} & D_4 \end{bmatrix} \begin{bmatrix} Q_m & \\ & Q_m \end{bmatrix} \times \quad (31)$$

$$\times \begin{bmatrix} Q_m^T & \\ & Q_m^T \end{bmatrix} \tilde{z}^{P_1} = \begin{bmatrix} Q_m^T & \\ & Q_m^T \end{bmatrix} \tilde{r}^{P_1} \Leftrightarrow \quad (32)$$

$$\begin{bmatrix} D_1 & \gamma_1 I_{mn} & & \\ \gamma_1 I_{mn} & \tilde{D}_2 & \gamma_2 I_{mn} & \\ & \gamma_2 I_{mn} & D_3 & \gamma_3 I_{mn} \\ & & \gamma_3 I_{mn} & \tilde{D}_4 \end{bmatrix} \tilde{\tilde{z}} = \tilde{\tilde{r}} \quad (33)$$

where $\tilde{D}_i=\mathrm{diag}(\Lambda_i, \ldots, \Lambda_i)$, i=2, 4, and $$\tilde{\tilde{z}} = \begin{bmatrix} Q_m^T & & \\ & \ddots & \\ & & Q_m^T \end{bmatrix} \tilde{z}^{P_1}, \tilde{\tilde{r}} = \begin{bmatrix} Q_m^T & & \\ & \ddots & \\ & & Q_m^T \end{bmatrix} \tilde{r}^{P_1} \quad (34)$$

In a similar fashion as previously, the N×1 vectors is $\tilde{r}^{P_1}$, $\tilde{z}^{P_1}$, $\tilde{\tilde{r}}$, $\tilde{\tilde{z}}$ can be partitioned into ln sub-vectors of size m×1 each, and then the computation of $\tilde{\tilde{r}}$ from $\tilde{r}^{P_1}$ amounts to ln independent DCT-II transforms of size m, and the computation of $\tilde{z}^{P_1}$ from $\tilde{\tilde{z}}$ amounts to ln independent IDCT-II transforms of size m, leading to a serial operation count of O(lnm log m)=O(N log m).

If we now denote by $P_2$ the N×N permutation matrix that reorders the elements of a vector or the rows of a matrix as 1, mn+1, ..., (l−1)mn+1, 2, mn+2, ..., (l−1)mn+2, ..., mn, mn+mn, ..., (l−1)mn+mn, and by $P_2^T$ the inverse permutation matrix, then the system of eq. (33) is eventually equivalent to:

$$P_2 \begin{bmatrix} \tilde{D}_1 & \gamma_1 I_{mn} & & \\ \gamma_1 I_{mn} & \tilde{D}_2 & \gamma_2 I_{mn} & \\ & \gamma_2 I_{mn} & \tilde{D}_3 & \gamma_3 I_{mn} \\ & & \gamma_3 I_{mn} & \tilde{D}_4 \end{bmatrix} P_2^T P_2 \tilde{\tilde{z}} = P_2 \tilde{\tilde{r}} \Leftrightarrow \quad (35)$$

$$\mathrm{diag}(\tilde{T}_{1,1}, \tilde{T}_{1,2}, \ldots, \tilde{T}_{1,m}, \tilde{T}_{2,1}, \ldots, \tilde{T}_{2,m}, \ldots, \tilde{T}_{n,m}) \tilde{\tilde{z}}^{P_2} = \tilde{\tilde{r}}^{P_2} \quad (36)$$

where $$\tilde{T}_{i,j} = \begin{bmatrix} \lambda_{1,i} & \gamma_1 & & \\ \gamma_1 & \lambda_{2,j} & \gamma_2 & \\ & \gamma_2 & \lambda_{3,i} & \gamma_3 \\ & & \gamma_3 & \lambda_{4,j} \end{bmatrix}, i=1,\ldots,n, j=1,\ldots,m \quad (37)$$

and $\tilde{\tilde{z}}^{P_2}=P_2\tilde{\tilde{z}}$, $\tilde{\tilde{r}}^{P_2}=P_2\tilde{\tilde{r}}$. If the N×1 vectors $\tilde{\tilde{z}}^{P_2}$, $\tilde{\tilde{r}}^{P_2}$ are partitioned into mn sub-vectors $\tilde{\tilde{z}}_{(i-1)m+j}^{P_2}$, $\tilde{\tilde{r}}_{(i-1)m+j}^{P_2}$ of size l×1 each (i=1, ..., n, j=1, ..., m), then the system from eq. (36) effectively represents mn independent tridiagonal systems $\tilde{T}_{i,j}\tilde{\tilde{z}}_{(i-1)m+j}^{P_2}=\tilde{\tilde{r}}_{(i-1)m+j}^{P_2}$ of size l which can be solved w.r.t. the sub-vectors $\tilde{\tilde{z}}_{9i-1)m+j}^{P_2}$ (to produce the whole vector $\tilde{\tilde{z}}^{P_2}$) in a total of O(lmn)=O(N) serial operations. For each such system, the coefficient matrix of eq. (37) is known beforehand and is determined exclusively by the eigenvalues given in eq. (12) and the values $\gamma_i$ of the matrix M. The equivalence of the system Mz=r, with M as in eq. (21), to the system of eq. (36), gives a procedure for solution of Mz=r in a near-optimal number of O(N)+O(N(log n+log m))=O(N log(nm)) operations, which is described in Algorithm 3 below. Note that apart from the near-optimal serial complexity, both algorithms entail a great amount of task-level parallelism. The m DCT-II/IDCT-II transforms and the n tridiagonal systems of Algorithm 3, as well as the lm first-level DCT-II/IDCT-II transforms respectively, the ln second-level DCT-II/IDCT-II transforms, and the inn tridiagonal systems of Algorithm 3 are completely independent to each other and can be executed in parallel. Furthermore, the FFT is a highly-parallel algorithm by itself, allowing for further acceleration of the individual transforms when executed on parallel platforms.

Figure 8:
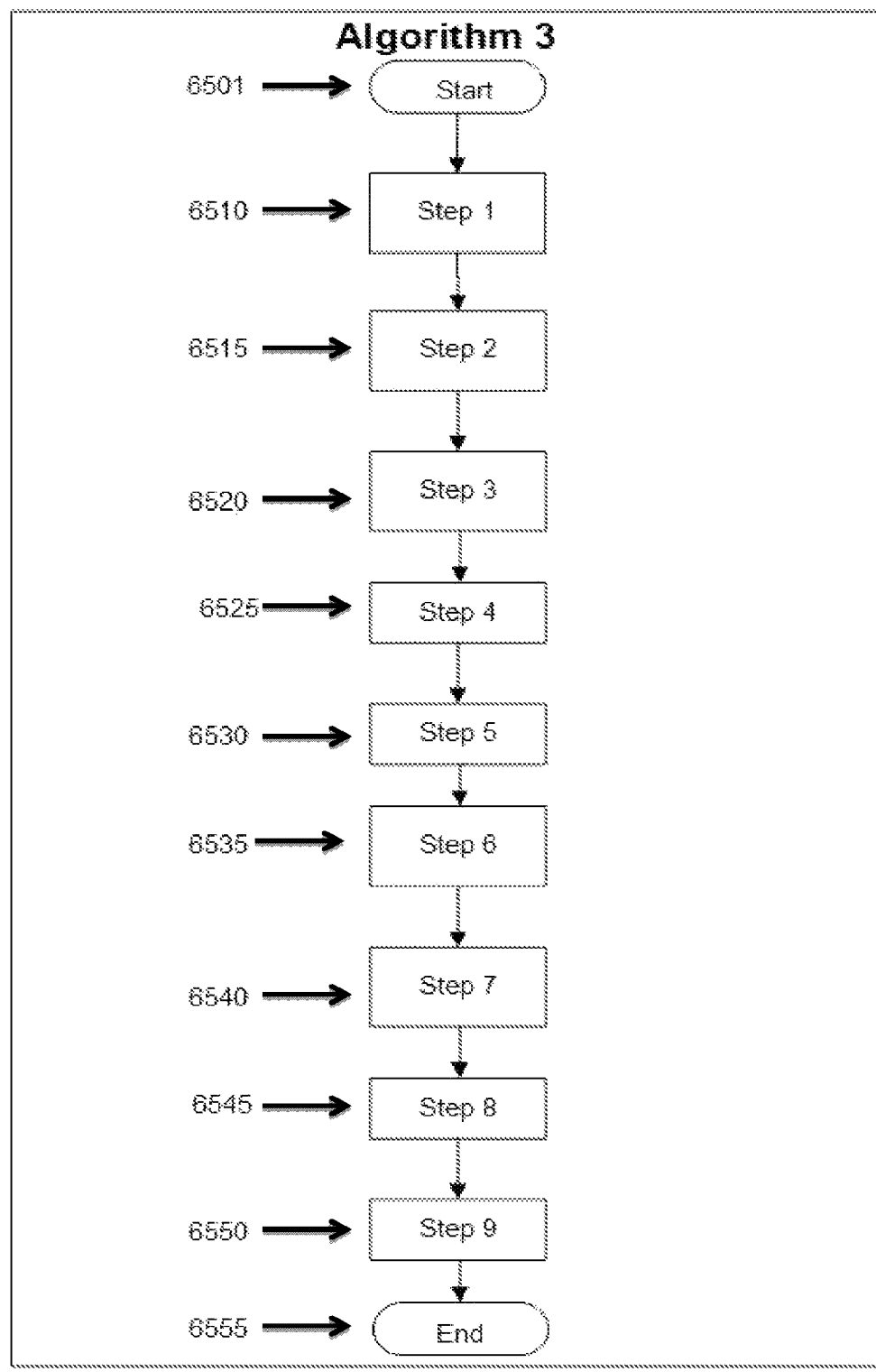
FIG. 8 presents the flow of a preferred method for solving the preconditioner that corresponds to the 3D regular grid.

Algorithm 3 (presented in FIG. 8). Fast Transform algorithm for the preconditioner solve step Mz=r, where M is of the form of eq. (21):

1. Partition the RHS vector r into lm sub-vectors $r_i$ of size n, and perform DCT-II transform ($Q_n^T r_i$) on each sub-vector to obtain transformed vector $\check{r}$.
2. Partition vector $\check{r}$ into l sub-vectors $\check{r}_i$ of size mn, and permute each sub-vector by permutation P, which orders elements as 1, n+1, ..., (m−1)n+1, 2, n+2, ..., (m−1)n+2, ..., n, n+n, ..., (m−1)n+n, in order to obtain vector $\check{r}^{P_1}$.
3. Partition vector $\check{r}^{P_1}$ into ln sub-vectors $\check{r}_i^{P_1}$ of size m, and perform DCT-II transform ($Q_m^T \check{r}_i^{P_1}$) on each sub-vector to obtain transformed vector $\tilde{\tilde{r}}$.
4. Permute vector $\tilde{\tilde{r}}$ in order to obtain vector $\tilde{\tilde{r}}^{P_2}$, by applying permutation $P_2$, which orders elements as 1, mn+1, 2mn+1, ..., (l−1)mn+1, 2, mn+2, 2mn+2, ..., (l−1)mn+2, ..., mn, ..., (l−1) mn+mn
5. Solve the mn tridiagonal systems (36) with known coefficient matrices from eq. (37), in order to obtain vector $\tilde{\tilde{z}}^{P_2}$.
6. Apply inverse permutation $P_2^T$ on vector $\tilde{\tilde{z}}^{P_2}$ so as to obtain vector $\tilde{\tilde{z}}$.
7. Partition vector $\tilde{\tilde{z}}$ into ln sub-vectors $\tilde{\tilde{z}}_i$ of size m, and perform IDCT-II transform ($Q_m \tilde{\tilde{z}}_i$) on each sub-vector to obtain vector $\tilde{z}^P$ is 1.
8. Partition vector $\tilde{z}^{P_1}$ into l sub-vectors $\tilde{z}_i^{P_1}$ of size mn, and apply inverse permutation $P^T$ on each sub-vector to obtain vector $\tilde{z}$.
9. Partition vector $\tilde{z}$ into lm sub-vectors $\tilde{z}_i$ of size n, and perform IDCT-II transform $Q_n \tilde{z}_i$) on each sub-vector to obtain final solution vector z.

The intuition behind preconditioner's formulation is to create a matrix M that will approximate the circuit matrix A as faithfully as possible, while at the same time enable the utilization of efficient algorithms for the solution of systems Mz=r. We have developed such an algorithm based on a Fast Transform solver in the previous section for a class of matrices with special structure. This section will describe the construction of a preconditioner with such structure from a given power grid by exploiting its spatial geometry.

Practical power grids are created as orthogonal wire meshes with very regular spatial geometries, with possibly some irregularities imposed by design constraints (e.g. some missing connections between adjacent nodes), and arranged in a few—typically 2 to 6—metal layers of alternating routing directions (horizontal and vertical). Due to the presence of vias between successive metal layers, the actual grid has the structure of a 3D mesh, with very few planes along the third dimension. However, as it was observed in Feng et al. (cited above), electrical resistances of vias are usually much smaller than wire resistances; leading to voltage drops much less than 1 mV. Also, data in Shi et al. (cited above) show that almost all circuit elements (mainly resistances) in each metal layer have the same values (with few differences due to grid irregularities). Based on these observations, we create a preconditioner matrix that approximates the circuit matrix of the power grid by a process of regularization of the 3D power grid to a regular 2D grid. The regularization process is described in Algorithm 4 below.

Figure 9:
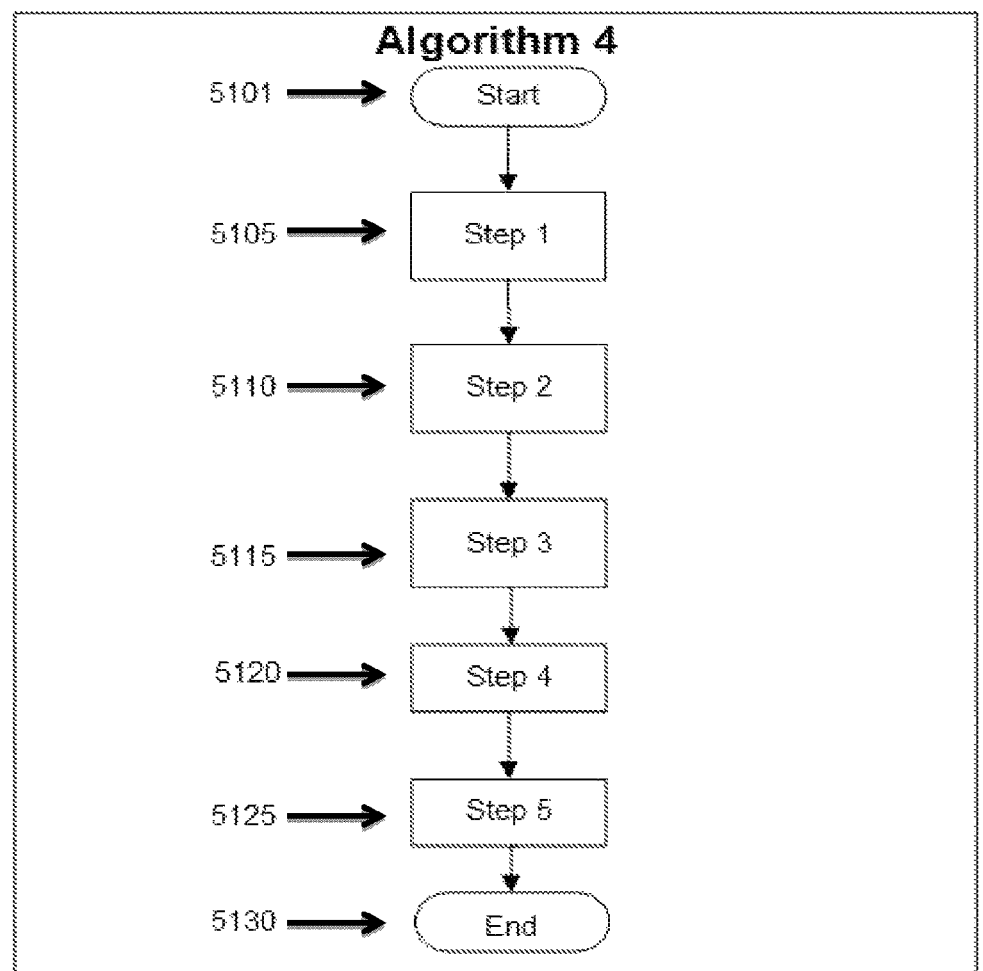
FIG. 9 presents the flow of a preferred method for 2D grid regularization according to the invention.

Algorithm 4 (presented in FIG. 9). We describe an algorithm for regularizing a 3D irregular to 2D regular power grid for preconditioning, according to an embodiment:

1. Determine the distinct x- and y-coordinates of all nodes in the different layers of the 3D grid, and take their Cartesian product to specify the location of the nodes in the regular 2D grid.
2. By disregarding via resistances between layers, collapse the 3D grid onto the regular 2D grid by adding together all horizontal branch conductances $$g^h \equiv \frac{1}{r^h + \frac{l^h}{h_k}}$$

connected in parallel between adjacent nodes in the x-direction of the 2D grid, and all vertical branch conductances $$g^v \equiv \frac{1}{r^v + \frac{l^v}{h_k}}$$

connected in parallel between adjacent nodes in the y-direction of the 2D grid (where $r^h$, $l^h$ denote the resistance and inductance of horizontal branches, and $r^v$, $l^v$ denote the resistance and inductance of vertical branches—the inductances might not be present in the model). If a conductance of the 3D grid occupies multiple nodes of the regular 2D grid, it is decomposed into a corresponding number of pieces. The node capacitances corresponding to the same regular grid nodes are also added together during the collapsing.
3. In the regular 2D grid, substitute horizontal branch conductances by their average value in each horizontal rail, and vertical branch conductances by their average value in each vertical slice (a slice is the part of a rail between two adjacent horizontal rails).
4. Substitute node capacitances in each horizontal rail by their average value as well.
5. Amortize the total sum of pad conductances of a specific horizontal rail (in the regular 2D grid) to all nodes of this rail, i.e. assume that all nodes of the i-th horizontal rail have pad conductance $$\bar{g}_i^p = \frac{\left(\sum g^p\right)_i}{n},$$

where $(\Sigma_g^P)_i$ is the sum of the actual pad conductances attached to nodes of the i-th horizontal rail.

Figure 2:
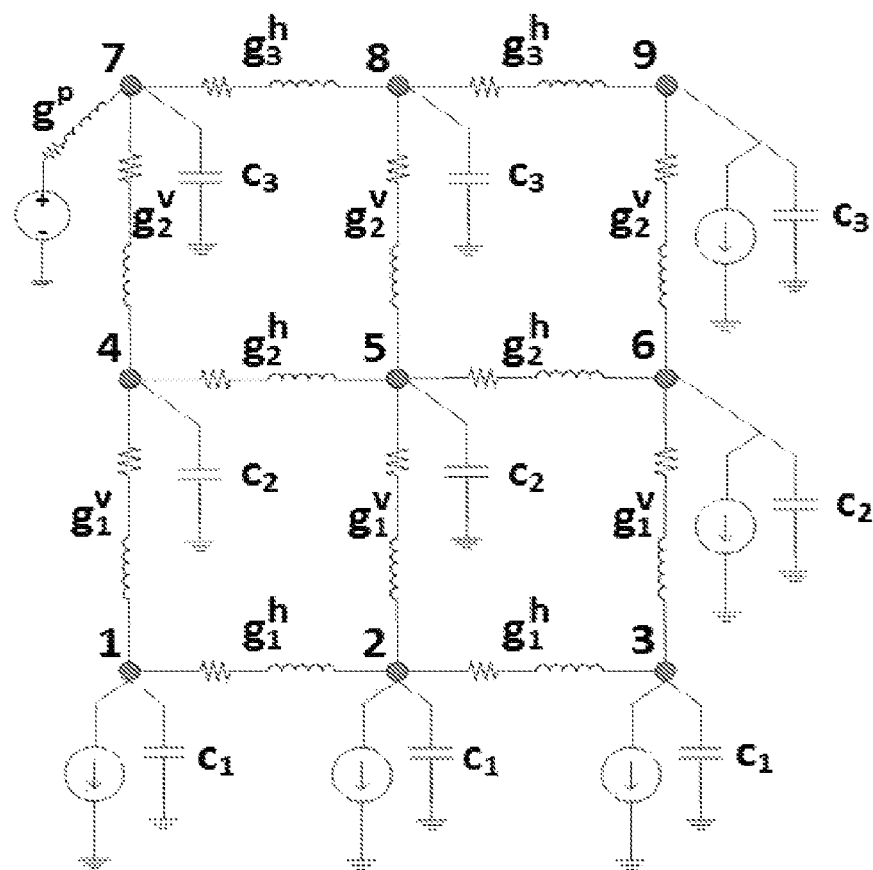
FIG. 2 illustrates the regular grid obtained after the 2D regularization process.

FIG. 1 depicts a 3D drawing of a 3-layer power delivery network 101 with m=3 horizontal rails 111, 112, 113 and n=3 vertical rails 121, 122, 123 in likewise-routed layers. FIG. 2 shows the 2D regular grid 201 that results from the regularization process (Algorithm 4) used to construct the preconditioner matrix, which collapses the 3D network 101 to a 2D one by assuming ideal via contacts 131. If we use the depicted natural node numbering 1 through 9 (proceeding horizontally, since this is usually the routing direction of the lowest-level metal layer), the matrix $$A_{rl}\left(R_b + \frac{L_b}{h_k}\right)^{-1} A_{rl}^T + \frac{C_n}{h_k}$$

that corresponds to the regular 2D grid will be the following block-tridiagonal matrix:

$$\begin{bmatrix} T_1 & -g_1^v I & \\ -g_1^v I & T_2 & -g_2^v I \\ & -g_2^v I & T_3 \end{bmatrix} \quad (38)$$

where $T_1$, $T_2$, $T_3$ are 3×3 tridiagonal matrices (each one corresponding to a horizontal rail of the 2D grid) which have the form:

$$T_1 = \begin{bmatrix} g_1^h + g_1^v + \bar{g}_1^p + \frac{c_1}{h_k} & -g_1^h & \\ -g_1^h & 2g_1^h + g_1^v + \bar{g}_1^p + \frac{c_1}{h_k} & -g_1^h \\ & -g_1^h & g_1^h + g_1^v + \bar{g}_1^p + \frac{c_1}{h_k} \end{bmatrix} \quad (39)$$

$$T_2 = \begin{bmatrix} g_2^h + g_1^v + g_2^v + \frac{c_2}{h_k} & -g_2^h & \\ -g_2^h & 2g_2^h + g_1^v + g_2^v + \frac{c_2}{h_k} & -g_2^h \\ & -g_2^h & g_2^h + g_1^v + g_2^v + \frac{c_2}{h_k} \end{bmatrix} \quad (40)$$

$$T_3 = \begin{bmatrix} g_4^h + g_2^v + \frac{c_3}{h_k} & -g_3^h & \\ -g_3^h & 2g_3^h + g_2^v + \frac{c_3}{h_k} & -g_3^h \\ & -g_3^h & g_3^h + g_2^v + \frac{c_3}{h_k} \end{bmatrix} \quad (41)$$

In the above, $g_i^h$ is the average horizontal conductance in the i-th horizontal rail, $g_i^v$ is the average vertical conductance in the i-th horizontal slice, and $c_i$ is the average node capacitance in the i-th horizontal rail. Also $h_k$ is the current analysis time-step (possibly variable), $$g^p \equiv \frac{1}{r^p + \frac{l^p}{h_k}}$$

is the parasitic conductance of the supply pads ($r^p$ and $l^p$ denote the resistance and inductance of the supply pads respectively), and $$\bar{g}_1^p = \frac{g^p}{3}.$$

As we can observe, the form of the above matrix is identical to eq. (10), which means that we have obtained a preconditioner M with an exact form that can be efficiently solved by the application of a Fast Transform. Moreover, it has to be mentioned that we have found that in practice it is usually better to amortize the total sum of pad conductances of a specific horizontal rail (in the regular 2D grid) to all nodes of this rail (step 4 in Algorithm 4). This also has the beneficial effect of making the preconditioner M non-singular in the case of DC analysis (where capacitances and inductances are absent). It is not difficult to generalize the procedure to an arbitrary m×n power grid. In that case, the preconditioner will comprise m blocks of size n×n and have the form of eq. (10), where $\alpha_1 = g_i^h$, $$\beta_i = g_i^v + g_{i-1}^v + \overline{g}_i^p + \frac{c_i}{h_k},$$

$\gamma_i = -g_i^v$, $i=1, \ldots, m$ (with $g_0^v = g_m^v = 0$).

Figure 3:
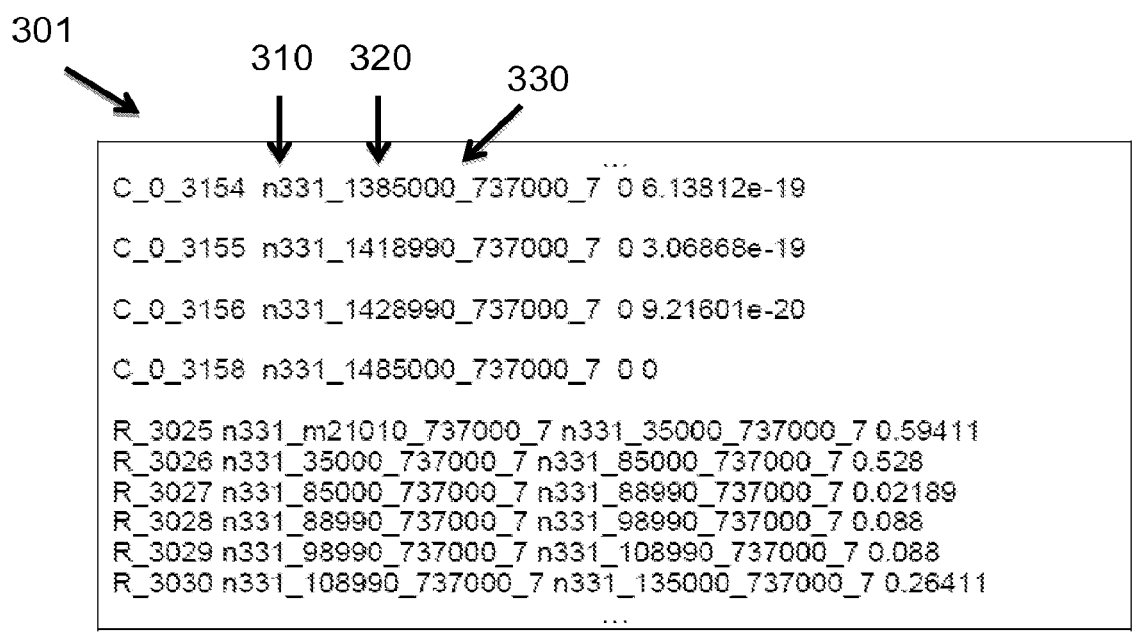
FIG. 3 illustrates the format of the netlist that is provided as input to the methods of the present invention.

According to a preferred embodiment, the preconditioner construction requires only a simple parsing of the netlist of the electrical circuit representing the power grid, where the name of each node in the input netlist is chosen to contain geometry information in its suffix. More specifically, as shown in FIG. 3, the netlist 301 contains the x (310) and y (320) coordinates as well as the number of the corresponding metal layer (330). These coordinates and metal numbers can be trivially passed to the netlist by the layout extraction tool that produces the model of the power grid, since the said tool will typically have access to this information in the course of processing the polygons that comprise the power grid. Other variations of formatting this information to the netlist may include adding the coordinates and layer numbers (or layer names), in the form of comments or 'pragmas' in the netlist, next to the electrical elements they correspond to. In any case, parsing of the input netlist is of complexity O(N) (considering that the number of electrical elements is of the same order as the number of nodes N), which is inexpensive since it represents a one-time cost, roughly comparable to one iteration (and amortized over multiple iterations) of the CG method.

During transient analysis with variable time-step (which is almost always used in practical simulation scenarios), the construction of the preconditioner matrix has to be repeated at every change of time-step in the same O(N) operations. This is also necessary for all other known preconditioners, but is in fact very expensive for some of them e.g. multigrid preconditioners. However, a considerable simplification is possible in the very common case of resistive or RC-only electrical models (i.e. when inductances are absent from the model) since the change of time-step does not affect any actions in the construction procedure, and thus there is no need for a full reconstruction (but only, actually, an update in the eigenvalues from eq. (12) of the preconditioner matrix).

Advantages for 2D Networks:

Compared to the preconditioning mechanisms presented in Zhao et al. and Yang et al. (both cited above), the proposed preconditioner offers significant advantages. First, it provides a near-optimal method for solving the preconditioner solve step. Compared with the preconditioner presented in Zhao et al. that has a complexity of $O(N^{1.5})$, our method reduces the required complexity to O(N log n) operations in the case of a 2D network. In addition, it is amenable to massive parallelism and as a result execution times can be greatly reduced if parallel architectures are utilized. This is not the case for the preconditioner presented in Zhao et al., which requires the solution of triangular systems. Triangular linear systems provide limited parallelism and as a result the corresponding solution algorithms are not able to utilize parallel architectures efficiently. The second advantage of the preconditioner in this invention is that it can handle very efficiently every power delivery network design. The preconditioner presented in Yang et al. requires the existence of special areas in the grid with zero voltage drop as boundary condition, in order to formulate so-called "Poisson blocks" with Toeplitz matrix structure. This assumption can hinder preconditioner's applicability and efficiency for general power delivery networks.

Moreover, apart from the near-optimal complexity of solving the systems Mz=r, one other salient feature of the proposed preconditioner is that there is no need for explicit storage of the preconditioner matrix M. As it is easily observed, only the eigenvalues from eq. (12) and the values $\gamma_i = -g_i^v$ of M are necessary in the execution of Algorithm 2 (for formulation of the tridiagonal systems from eq. (19) with coefficient matrices from eq. (20)), and thus only storage for those $mn+(m-1)$ values needs to be allocated. A small memory footprint is very important for mapping the algorithm onto parallel computing architectures with limited available memory space such as GPUs.

Extending to 3D Power Delivery Networks:

In case that via resistances can not be ignored, the proposed methodology can be extended to accommodate for 3D networks. Referring back to FIG. 1, we can take the average resistance among the rails from each metal layer, assuming that there exist vias connecting every node from layer i with the corresponding node in layer i+1, and utilize Algorithm 5 below to create a regular 3D power grid.

Figure 10:
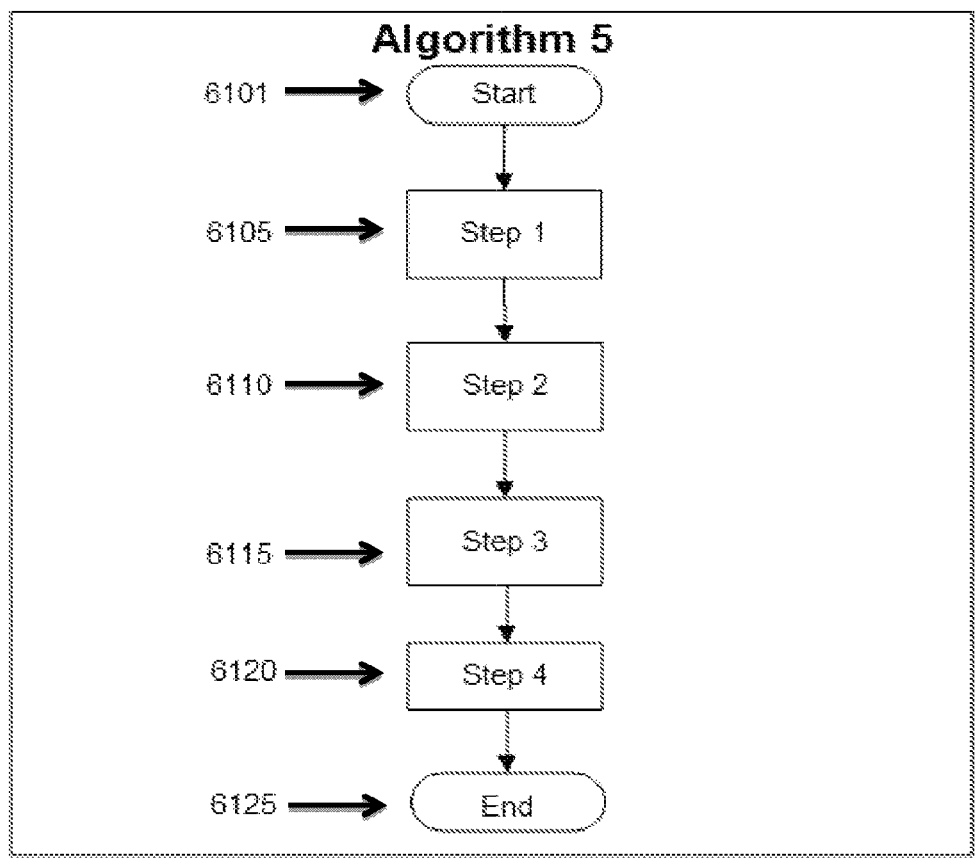
FIG. 10 presents the flow of a preferred method for 3D grid regularization according to the invention.

Algorithm 5 (presented in FIG. 10). We provide an algorithm for regularizing a 3D irregular to 3D regular power grid for preconditioning, according to an embodiment:

1. Determine the distinct x- and y-coordinates of all nodes in the different layers of the 3D grid, and take their Cartesian product to specify the location of the nodes in the regular 3D grid.
2. Substitute all branch conductances $$g_i \equiv \frac{1}{r_i + \frac{l_i}{h_k}}$$

in each metal layer by their average value within this layer (the inductances $l_i$ might not be present in the model).

3. Substitute node capacitances $c_i$ in each layer by their average value as well.
4. Substitute the average value in all via conductances connecting two successive metal layers.

Figure 4:
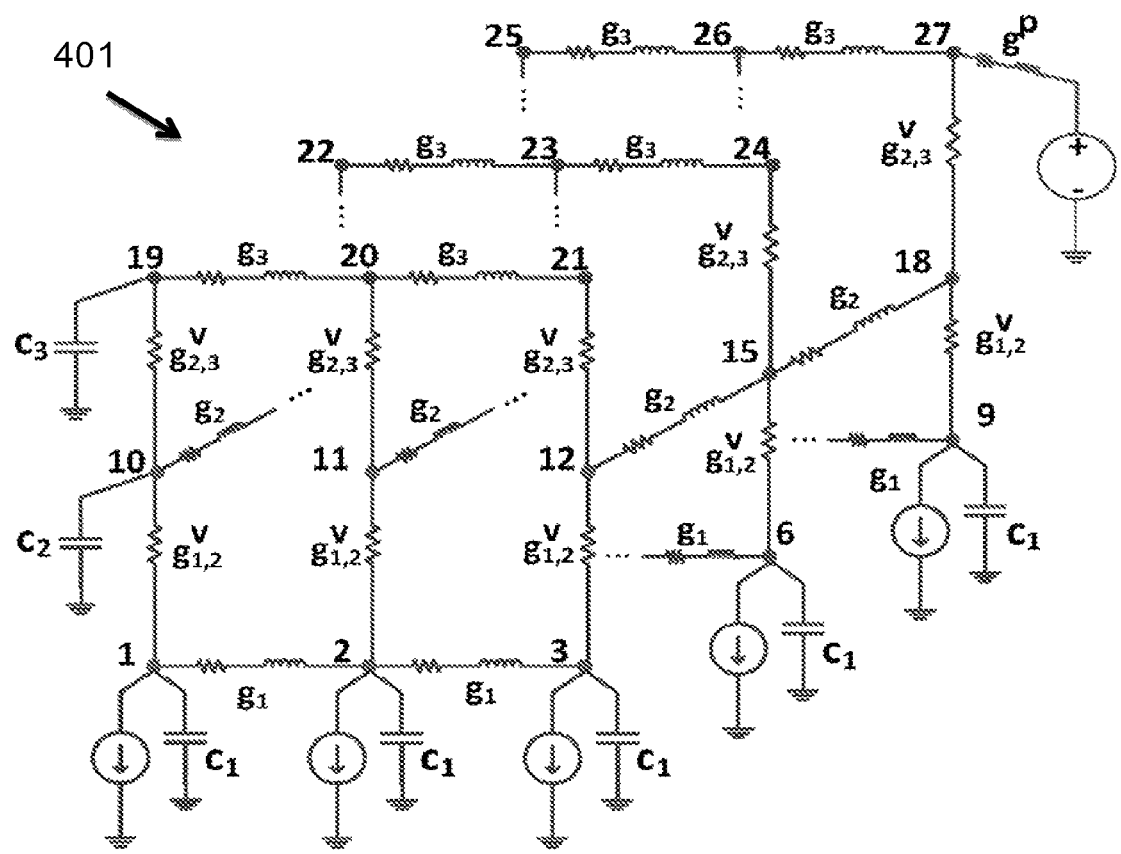
FIG. 4 illustrates the regular grid obtained after the 3D regularization process.

According to a preferred embodiment in the 3D case, with reference to FIG. 4, the resulting regular 3D grid 401 is used for preconditioning and the corresponding circuit matrix has the following form:

$$M = \begin{bmatrix} M_1 & -g_{1,2}^v I_{mn} & \\ -g_{1,2}^v I_{mn} & M_2 & -g_{2,3}^v I_{mn} \\ & -g_{2,3}^v I_{mn} & M_3 \end{bmatrix} \quad (42)$$

where $$M_1 = \text{diag}(T_1, T_1, T_1), M_3 = \text{diag}(T_3, T_3, T_3) \quad (43)$$

$$M_2 = \begin{bmatrix} \left(\begin{array}{c} g_2 + g_{1,2}^v + \\ g_{2,3}^v + \frac{c_2}{h_k} \end{array}\right)I_n & -g_2 I_n & \\ -g_2 I_n & \left(\begin{array}{c} 2g_2 + g_{1,2}^v + \\ g_{2,3}^v + \frac{c_2}{h_k} \end{array}\right)I_n & -g_2 I_n \\ & -g_2 I_n & \left(\begin{array}{c} g_2 + g_{1,2}^v + \\ g_{2,3}^v + \frac{c_2}{h_k} \end{array}\right)I_n \end{bmatrix} \quad (44)$$

$$T_1 = \begin{bmatrix} g_2 + g_{1,2}^v + \frac{c_1}{h_k} & -g_1 & \\ -g_1 & 2g_1 + g_{1,2}^v + \frac{c_1}{h_k} & -g_1 \\ & -g_1 & g_1 + g_{1,2}^v + \frac{c_1}{h_k} \end{bmatrix} \quad (45)$$

$$T_3 = \begin{bmatrix} g_3 + g_{2,3}^v + g^P + \frac{c_3}{h_k} & -g_3 & \\ -g_3 & 2g_3 + g_{2,3}^v + \frac{c_3}{h_k} & -g_3 \\ & -g_3 & g_3 + g_{2,3}^v + \frac{c_3}{h_k} \end{bmatrix} \quad (46)$$

In the above, $g_i$ and $c_i$ denote the average branch conductance and the average node capacitance in the i-th metal layer. Also $h_k$ is the current analysis time-step (possibly variable), $g_{i,i+1}^v$ is the average via conductance connecting the i-th and (i+1)-th metal layers, and $$g^P \equiv \frac{1}{r^P + \frac{l^P}{h_k}}$$

is the parasitic conductance of the supply pads.

We observe that the form of the above matrix is almost identical to (21), with the exception of the pad parasitic conductance $g^P$ in few places along the diagonal of the $M_3$ block that corresponds to the uppermost metal layer. In order to obtain a preconditioner M with an exact form that can be efficiently solved by a 3D Fast Transform solver, we can just omit entirely those pad parasitics. However, we have observed that in practice it is usually better to amortize the total sum of pad conductances of the uppermost metal layer (in the regular 3D grid) to all nodes of this layer, i.e. assume that all nodes of the uppermost layer have pad conductance $$\bar{g}^P = \frac{\sum g^P}{nm},$$

where $\Sigma g^P$ is the sum of the actual pad conductances attached to nodes of the uppermost layer. This also has the beneficial effect of making the preconditioner M non-singular in the case of DC analysis (where capacitances are absent). In the above example, the blocks $T_3$ of $M_3$ would become:

$$T_3 = \begin{bmatrix} g_3 + g_{2,3}^v + & & & \\ \bar{g}^P + \frac{c_3}{h_k} & -g_3 & & \\ & 2g_3 + g_{2,3}^v + & & \\ -g_3 & \bar{g}^P + \frac{c_3}{h_k} & -g_3 & \\ & & g_3 + g_{2,3}^v + & \\ & -g_3 & \bar{g}^P + \frac{c_3}{h_k} & \end{bmatrix} \quad (47)$$

where $\bar{g}^P = g^P/9$. It is not difficult to generalize the procedure to an arbitrary power grid with m horizontal rails, n vertical rails and l layers. In that case, the preconditioner will comprise l blocks of size mn×mn and have the form (21), where $\alpha_i = g_i$, (i=1, ..., l), $$\beta_i = g_{i-1,i}^v + g_{i,i+1}^v + \frac{c_i}{h_k}, (i=1, \ldots, l-1,$$

with $g_{0,1}^v = 0$), $$\beta_l = g_{l-1,l}^v + \bar{g}^P + \frac{c_l}{h_k},$$

and $\gamma_i = g_{i,i+1}^v$ (i=1, ..., l-1).

Advantages for 3D Networks:

Compared to the preconditioning mechanisms presented in Zhao et al. and Yang et al. (both cited above), the proposed preconditioner offers significant advantages, similar to those described under "Advantages for 2D networks" above. Compared with the preconditioner presented in Zhao et al. that has a complexity of $O(N^{1.5})$, our invention reduces the required complexity to $O(N)+O(N(\log n+\log m))=O(N \log (nm))$ operations and is amenable to massive parallelism.

Procedure Implementation and Opportunities for Parallelism:

After the preconditioner construction and storage, the whole procedure involves execution of Algorithm 1 with Algorithm 2 for 2D or Algorithm 3 for 3D power delivery network designs, in place of the preconditioner solve step Mz=r. The proposed overall procedure for transient analysis of power delivery networks is depicted in Algorithm 6 below. Every part of this procedure offers ample multi-grain parallelism, both data- and task-level, thus enabling highly parallel computing efficiency. This comes in contrast with most standard preconditioning methods, such as incomplete factorizations, which have limited parallelism, either data-level or task-level. The details for each major part of the procedure, as well as the opportunities for introducing parallelism are presented below.

Figure 5:
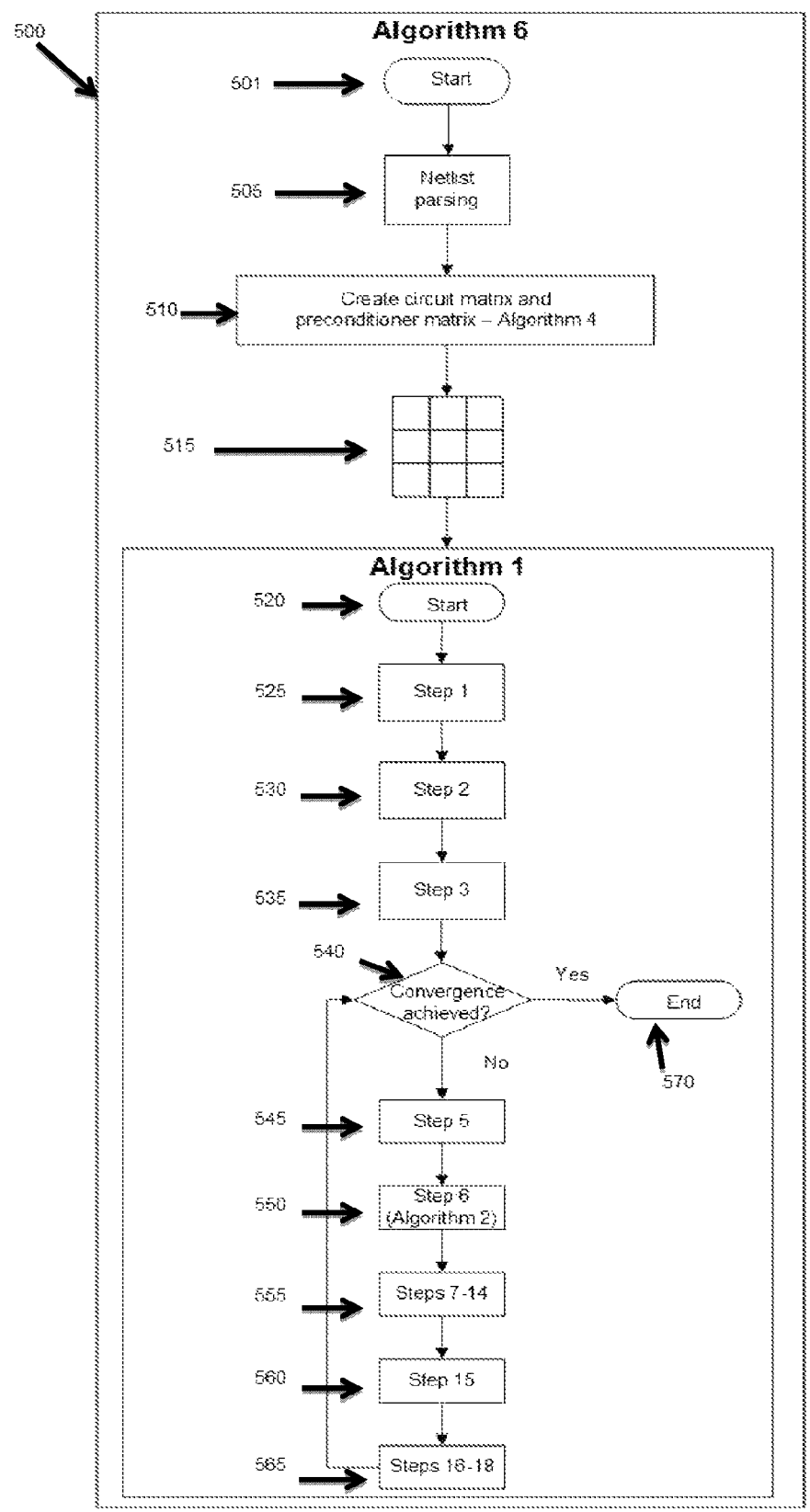
FIG. 5 presents the flow of a preferred method for 2D network simulation according to the invention.
Figure 6:
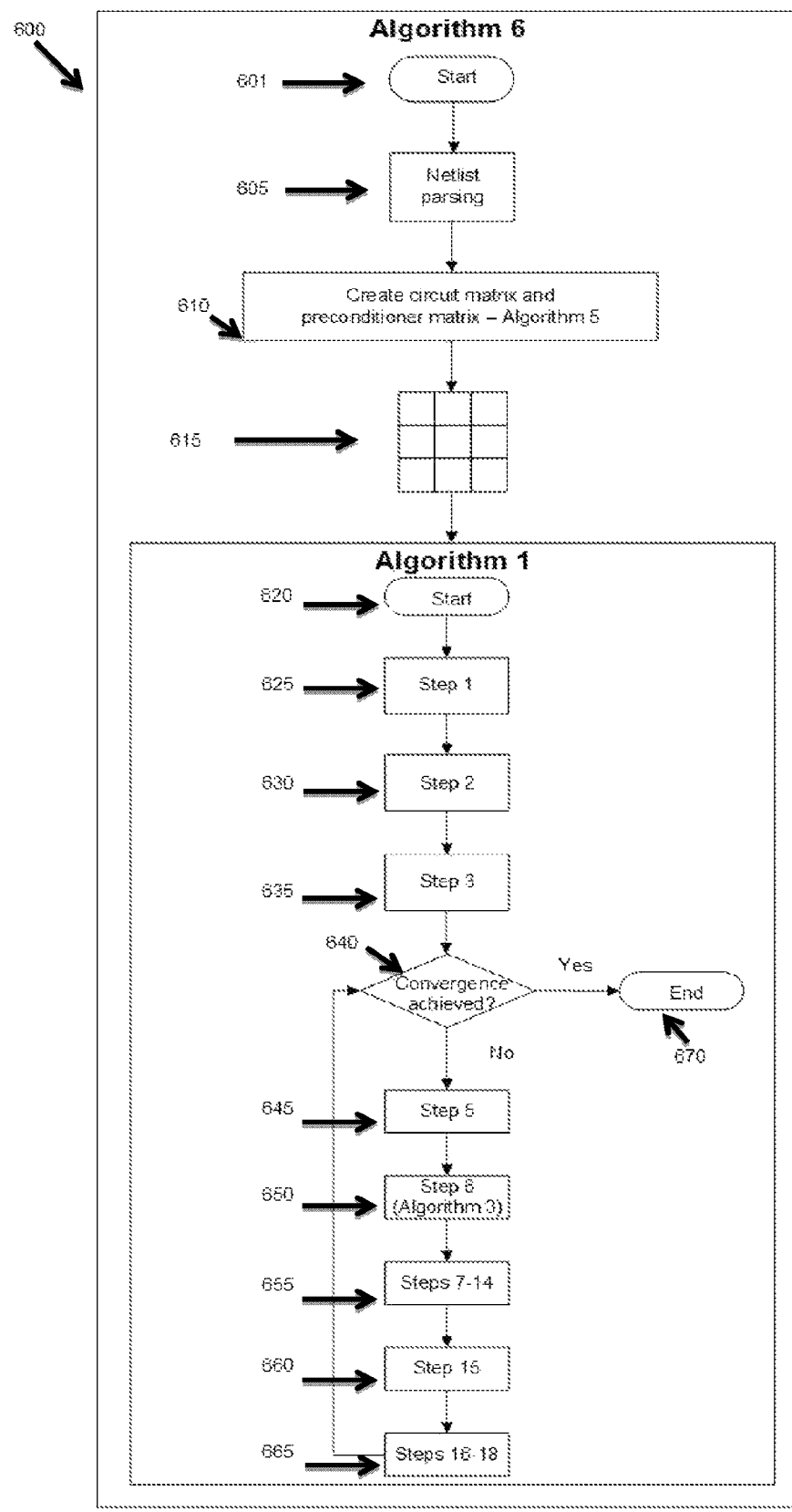
FIG. 6 presents the flow of a preferred method for 3D network simulation according to the invention.

Algorithm 6 for 2D networks. With reference to FIG. 5, the preferred algorithm for power grid transient analysis 500 includes the following steps (501, 505, 510, 515, 520, 525, 530, 535, 540, 545, 550, 555, 560, 565 and 570):

1. Parse netlist data 505
2. Create circuit matrix and preconditioner matrix 510, 515 with Algorithm 4 (described above and depicted in FIG. 9 with steps referenced as 5101, 5105, 5110, 5115, 5120, 5125 and 5130)
3. for all time-steps do
4. If time-step has changed
5. Reconstruct preconditioner 515 (update preconditioner's eigenvalues)
6. end if
7. Solve linear system from eq. (9) using PCG (Algorithm 1, 520 through 565 in FIG. 5) employing Algorithm 2 (550) (described above and depicted in FIG. 7 with steps referenced as 5501, 5510, 5515, 5520, 5525, 5530 and 5535).
8. end for Algorithm 6 for 3D networks. With reference to FIG. 6, the preferred algorithm for power grid transient analysis 600 includes the following steps (601, 605, 610, 615, 620, 626, 630, 635, 640, 645, 650, 655, 660, 665 and 670):

1. Parse netlist data 605
2. Create circuit matrix and preconditioner matrix 610, 615 with Algorithm 5 (described above and depicted in FIG. 10 with steps referenced as 6101, 6105, 6110, 6115, 6120 and 6125)
3. for all time-steps do 4. If time-step has changed
5. Reconstruct preconditioner 615 (update preconditioner's eigenvalues)
6. end if
7. Solve linear system from eq. (9) using PCG (Algorithm 1, 520 through 565 in FIG. 5) employing Algorithm 3 (650) (described above and depicted in FIG. 8 with steps referenced as 6501, 6510, 6515, 6520, 6525, 6530, 6535, 6540, 6545, 6550 and 6555.)
8. end for As seen in Algorithm 1, apart from the preconditioner solve step, the PCG method involves 2 inner products and 1 sparse matrix-vector product per iteration, which can be implemented efficiently by available BLAS-1 and BLAS-2 (Basic Linear Algebra Subroutines) kernels. The algorithm also has 3 scalar-vector products with vector updates per iteration which can be fully parallelized.

In addition, in order to apply the independent DCT-II and IDCT-II transforms in Algorithm 2 (5510 and 5530 in FIG. 7) and Algorithm 3 (6510, 6520, 6540 and 6550 in FIG. 8), we can use a modification of the one-dimensional Fast Fourier Transform (FFT) algorithm (as described in C. Van Loan, "*Computational Frameworks for the Fast Fourier Transform*", SIAM, 1992, which is incorporated herein by reference in its entirety), which gives a near-optimal sequential complexity of O(n log n) operations for each transform of size n. FFT is also a highly parallel algorithm and an ideal candidate for mapping onto a parallel computing architecture, with a parallel complexity of O((n log n)/p), where p is the number of available processors.

The solution of tridiagonal systems in Algorithm 2 (5520 in FIG. 7) and Algorithm 3 (6530 in FIG. 8), offers abundant data-level parallelism as well, and various algorithms have been proposed in the literature for its implementation on parallel architectures. These can be classified to algorithms that target coarse-grain parallelism (and are appropriate for multi-core processors) such as two-way Gaussian elimination or Bondelli's algorithm (as described in paper P. Quesada-Barriuso, J. Lamas-Rodriguez, D. B. Heras, M. Ból, and F. Argüello, "Selecting the Best Tridiagonal System Solver Projected on Multi-Core CPU and GPU Platforms", *Int. Conf. on Parallel and Distributed Processing Techniques and Applications* (as part of *WorldComp*2011 Conference), which is incorporated herein by reference in its entirety) and to algorithms that exploit fine-grain parallelism (and are appropriate for GPUs) such as Parallel Cyclic Reduction (as described in paper Y. Zhang, J. Cohen, and J. D. Owens, "Fast Tridiagonal Solvers on the GPU", *ACM SIGPLAN Symposium on Principles and Practice of Parallel Programming*, 2010, which is incorporated herein by reference in its entirety).

Figure 11:
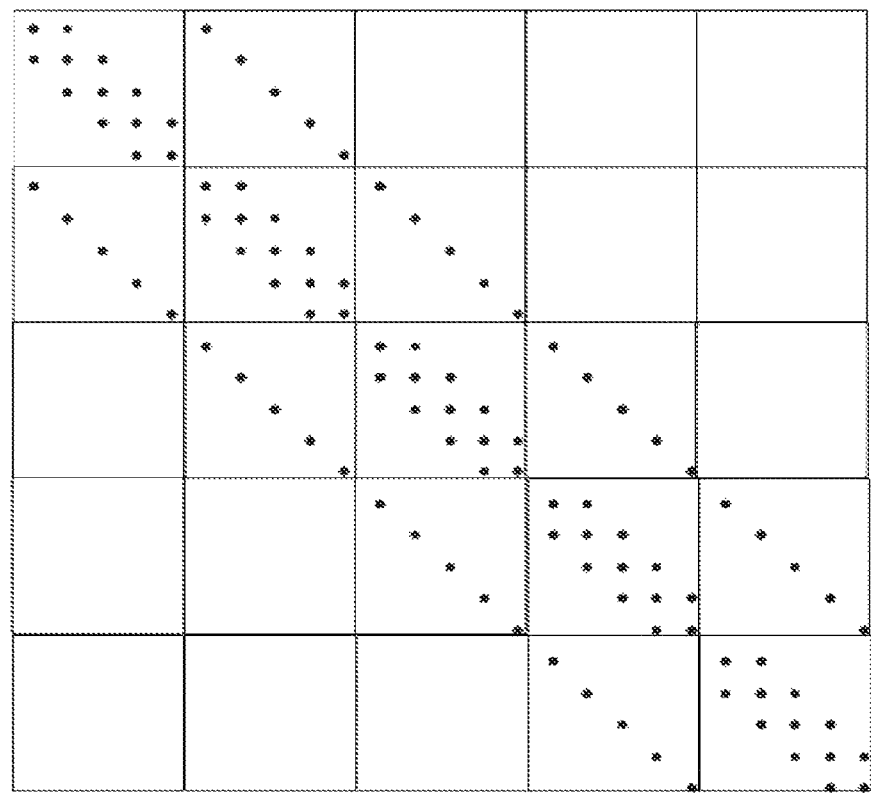
FIG. 11 illustrates the preferred structure of a preconditioner matrix for 2D networks according to the invention.
Figure 12:
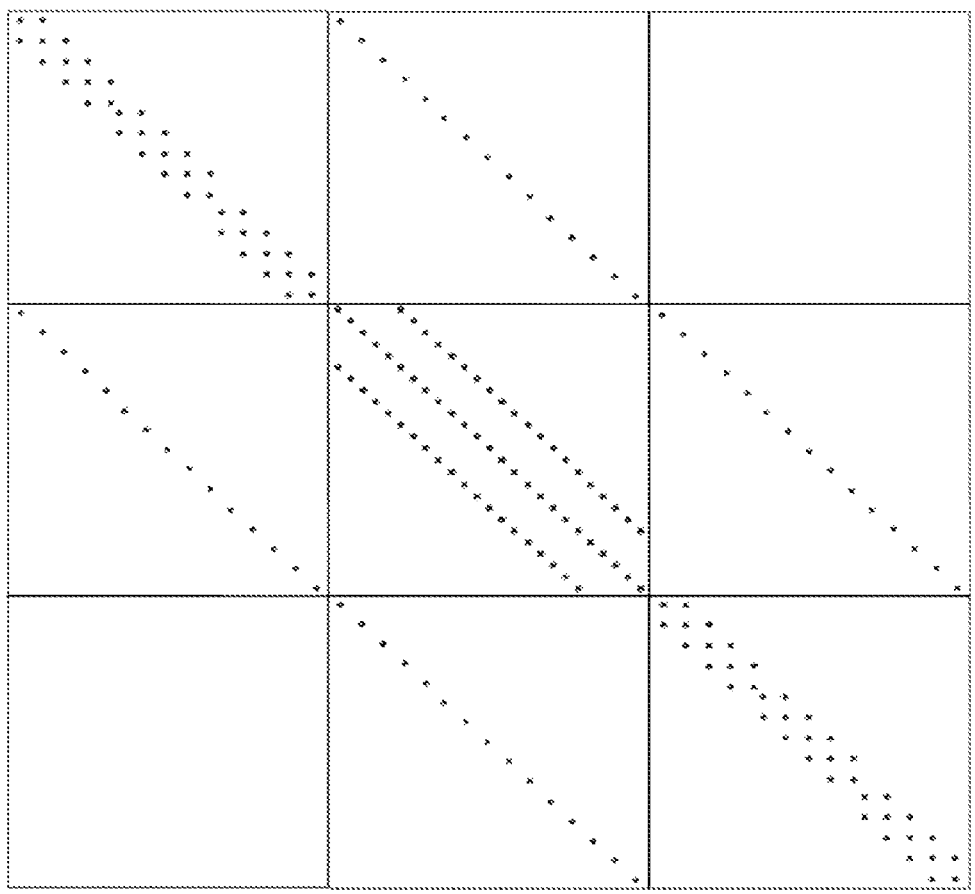
FIG. 12 illustrates the preferred structure of a preconditioner matrix for 3D networks according to the invention.

Moreover, Algorithm 2 and Algorithm 3 entail a number of DCT-II and IDCT-II transforms as well the solution of a series of tridiagonal systems, operating on sparse preconditioner matrices as depicted in FIG. 11 for 2D networks and FIG. 12 for 3D networks. In these figures, dots graphically represent the non-zero elements of the matrices. The preconditioner matrix form in FIG. 11 comprises off-diagonal blocks which are diagonal matrices and main diagonal blocks which are tridiagonal matrices; the preconditioner matrix form in FIG. 12 comprises off-diagonal blocks which are diagonal matrices and main diagonal blocks which are either tridiagonal or block diagonal matrices. As described above under "Algorithm 2" and "Algorithm 3", these solution steps can be broken down in smaller size partitions which may be processed independently of each other. This translates to additional task-level parallelism, which can lead to further acceleration of the whole preconditioner solve step on parallel computing architectures, where all independent transforms and tridiagonal solvers can be executed in parallel processes, requiring only a small amount of inter-process communication.

The present invention may be conveniently implemented using one or more conventional general purpose or specialized digital computer, computing device, machine, or microprocessor, including one or more processors, memory and/or computer readable storage media programmed according to the teachings of the present disclosure. In some embodiments, the one or more processors can be, for example, a general purpose graphics processing unit (GPU) commonly used as a modified form of stream processor. In other embodiment, the one or more processors can be, for example, a networked computer cluster. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The previous description of the preferred embodiments is provided to enable any person skilled in the art to make or use the embodiments of the present invention. While the invention has been particularly shown and described with reference to preferred embodiments thereof, it will be understood by those skilled in the art that various changes in form and details may be made therein without departing from the spirit and scope of the invention.

The invention claimed is:

1. A method for simulating time-varying responses of a plurality of points of a power delivery network of approximately N nodes, comprising:
    selecting a model of a power delivery network of a circuit having an irregular structure;
    parsing characteristic data describing the power delivery network;
    forming a circuit matrix relating to said characteristic data;
    regularizing the model;
    forming from the regularized model a preconditioner matrix with a specialized structure that allows solution with near optimal complexity, the preconditioner matrix having a sparse structure that allows use of a Fast Fourier Transform;
    solving said circuit matrix and preconditioner matrix with an iterative linear equation solution algorithm that includes applying said Fast Fourier Transform, using one or more processors; and
    reporting the responses at selected nodes and branches of the power delivery network to thereby improve performance of the power delivery network based on the circuit matrix and preconditioner matrix solutions.

2. The method of claim 1 wherein the model is of a resistor (R) network, a resistor-capacitor (RC) network, a resistor-inductor (RL) network, or a resistor-inductor-capacitor (RLC) network.

3. The method of claim 1 wherein the plurality of points include connections of digital gates to a power grid and preselected points on the network.

4. The method of claim 1 wherein a Modified Nodal Analysis (MNA) framework is used to form the circuit matrix.

5. The method of claim 1 wherein the iterative linear equation solution algorithm is a Preconditioned Conjugate Gradients method.

6. The method of claim 1, wherein said sparse structure includes off-diagonal blocks which are diagonal matrices and main diagonal blocks which are tridiagonal or block diagonal matrices.

7. The method of claim 6, wherein forming the preconditioner matrix includes the steps of:
regularizing the power delivery network based on topology information of the nodes of the power delivery network, the topology information including geometrical properties expressed by node coordinates, and
forming the preconditioner matrix using the Modified Nodal Analysis method on the regularized power delivery network.

8. The method of claim 7, wherein the power delivery network is regularized from an irregular 3D structure into a regular 2D equivalent.

9. The method of claim 7, wherein the power delivery network is regularized from an irregular 3D structure into a regular 3D equivalent which includes contact via resistances.

10. The method of claim 1 wherein the solving of one or both of the circuit matrix and preconditioner matrix is performed as a number of concurrent processes on multiple processors.

11. The method of claim 10 wherein the multiple processors are part of a Graphics Processing Unit.

12. The method of claim 10 wherein the multiple processors are part of a networked computer cluster.

13. The method of claim 1 wherein contact via resistances are included in the model of the power delivery network.

14. A system for simulating time-varying responses of a plurality of points of a power delivery network of approximately N nodes, comprising:
one or more processors; and
a simulation tool, executing on the one or more processors, wherein the simulation tool is operable for:
selecting a model of a power delivery network of a circuit having an irregular structure;
parsing the characteristic data describing the power delivery network;
forming a circuit matrix relating to said circuit characteristic data;
regularizing the model;
forming from the regularized model a preconditioner matrix with a specialized structure that allows solution with near optimal complexity, the preconditioner matrix having a sparse structure that allows use of a Fast Fourier Transform;
solving said circuit matrix and preconditioner matrix with an iterative linear equation solution algorithm that includes applying said Fast Fourier Transform; and
reporting the responses at selected nodes and branches of the power delivery network to thereby improve performance of the power delivery network based on the circuit matrix and precondition matrix solutions.

15. The system of claim 14 wherein the model is of a resistor (R) network, a resistor-capacitor (RC) network, a resistor-inductor (RL) network, or a resistor-inductor-capacitor (RLC) network.

16. The system of claim 14 wherein the plurality of points include connections of digital gates to a power grid and preselected points on the network.

17. The system of claim 14 wherein a Modified Nodal Analysis (MNA) framework is used to form the circuit matrix.

18. The system of claim 14 wherein the iterative linear equation solution algorithm is a Preconditioned Conjugate Gradients method.

19. The system of claim 14 wherein said sparse structure includes off-diagonal blocks which are diagonal matrices and main diagonal blocks which are either tridiagonal or block diagonal matrices.

20. The system of claim 19 wherein forming the preconditioner matrix further includes the steps of:
regularizing the power delivery network based on topology information of the nodes of the power delivery network, the topology information including geometrical properties expressed by node coordinates; and
forming the preconditioner matrix using the Modified Nodal Analysis method on the regularized power delivery network.

21. The system of claim 20, wherein an algorithm is utilized for regularizing the power delivery network into a 2D equivalent.

22. The system of claim 20, wherein an algorithm is utilized for regularizing the power delivery network into a 3D equivalent which includes contact via resistances.

23. The system of claim 14 wherein the solving of one or both of the circuit matrix and preconditioner matrix solution is performed as a number of concurrent processes on multiple processors.

24. The system of claim 23 wherein the multiple processors are part of a Graphics Processing Unit.

25. The system of claim 23 wherein the multiple processors are part of a networked computer cluster.

26. The system of claim 14 wherein contact via resistances are included in the model of the power delivery network.

27. A method for simulating time-varying responses of a plurality of points for a selected power delivery network of approximately N nodes using characteristic data describing the power delivery network, the method comprising:
forming a circuit matrix based on said characteristic data;
performing a regularization of a model of the power delivery network, the model having an irregular structure;
forming from the regularized model a preconditioner matrix having a specialized structure that allows solution with near optimal complexity, the preconditioner matrix having a sparse structure that allows use of a Fast Fourier Transform;
solving said circuit matrix and preconditioner matrix with an iterative linear equation solution algorithm that includes applying said Fast Fourier Transform; and
reporting the responses at selected nodes and branches of the power delivery network to thereby improve performance of the power delivery network based on the circuit matrix and preconditioner matrix solutions.

28. The method of claim 27, further comprising parsing the characteristic data.

29. The method of claim 27, wherein said sparse structure includes off-diagonal blocks which are diagonal matrices and main diagonal blocks which are tridiagonal or block diagonal matrices.

30. The method of claim 29, wherein forming the preconditioner matrix includes the steps of:
regularizing the power delivery network based on topology information of the nodes of the power delivery network, the topology information including geometrical properties expressed by node coordinates, and
forming the preconditioner matrix using the Modified Nodal Analysis method on the regularized power delivery network.

31. The method of claim 27, wherein the power delivery network is regularized from an irregular 3D structure into a regular 2D equivalent.

32. The method of claim 27, wherein the power delivery network is regularized from an irregular 3D structure into a regular 3D equivalent which includes contact via resistances.

33. The method of claim 27 wherein solving the preconditioner matrix includes using a Fast Fourier Transform performing the steps of:
partitioning a right hand side (RHS) vector into sub-vectors of a first specific size and performing a Discrete Cosine Transform of type-II (DCT-II) on each sub-vector to obtain a transformed vector;
partitioning the transformed vector into sub-vectors of a second specific size and applying a first specific permutation on each sub-vector of the transformed vector which reorders elements to obtain a second vector;
partitioning the second vector into sub-vectors of a third specific size and performing a DCT-I I on each sub-vector to obtain a third vector;
applying a second specific permutation on the third vector to obtain a fourth vector;
solving tridiagonal systems with known coefficient matrices to obtain a fifth vector;
applying the inverse of the second specific permutation on the fifth vector to obtain a sixth vector;
partitioning the sixth vector into sub-vectors of a fourth specific size and performing an Inverse DCT-I I on each sub-vector to obtain a seventh vector;
partitioning the seventh vector into sub-vectors of a fifth specific size and applying the inverse of the first specific permutation on each sub-vector of the transformed vector which reorders elements to obtain an eighth vector; and
partitioning the eighth vector into sub-vectors of a sixth size and performing an Inverse DCT-I I on each sub-vector to obtain a final solution vector.

34. A method for simulating time-varying responses of a plurality of points for a selected power delivery network of approximately N nodes using characteristic data describing the power delivery network, the method comprising:
forming a circuit matrix based on said characteristic data;
performing a regularization of a model of the power delivery network, the model having an irregular structure;
forming from the regularized model a preconditioner matrix having a specialized structure that allows solution with near optimal complexity, the preconditioner matrix having a sparse structure that allows use of a Fast Fourier Transform;
solving said circuit matrix and preconditioner matrix with an iterative linear equation solution algorithm that includes applying said Fast Fourier Transform; and
reporting the responses at selected nodes and branches of the power delivery network to thereby improve performance of the power delivery network based on the circuit matrix and preconditioner matrix solutions.

35. The method of claim 34, wherein said sparse structure includes off-diagonal blocks which are diagonal matrices and main diagonal blocks which are tridiagonal or block diagonal matrices.

36. The method of claim 35, wherein forming the preconditioner matrix includes the steps of:
regularizing the power delivery network based on topology information of the nodes of the power delivery network, the topology information including geometrical properties expressed by node coordinates, and
forming the preconditioner matrix using the Modified Nodal Analysis method on the regularized power delivery network.

37. The method of claim 34 wherein solving the preconditioner matrix includes using a Fast Fourier Transform performing the steps of:
partitioning a right hand side (RHS) vector into blocks of a specific size and performing a Discrete Cosine Transform of type-II (DCT-II) on each block to obtain a transformed vector;
applying a first specific permutation of the transformed vector which reorders elements to obtain a second vector;
solving tridiagonal systems with known coefficient matrices to obtain a third vector; applying the inverse of the first specific permutation on the third vector to obtain a fourth vector; and
partitioning the fourth vector into blocks of a specific size and performing an Inverse DCT-II on each block to obtain a final solution vector.

* * * * *